United States Patent
Yamamura et al.

(10) Patent No.: US 7,695,655 B2
(45) Date of Patent: Apr. 13, 2010

(54) METHOD FOR CUTTING CERAMIC MOLDED BODY AND METHOD MANUFACTURING HONEYCOMB STRUCTURED BODY

(75) Inventors: Norihiko Yamamura, Ibi-gun (JP); Kazuya Naruse, Courtenay (FR); Eiji Sumiya, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 7 days.

(21) Appl. No.: 11/697,574

(22) Filed: Apr. 6, 2007

(65) Prior Publication Data
US 2007/0235895 A1    Oct. 11, 2007

Related U.S. Application Data

(63) Continuation of application No. PCT/JP2006/307645, filed on Apr. 11, 2006.

(51) Int. Cl.
*B28B 5/00* (2006.01)
*B28B 3/20* (2006.01)

(52) U.S. Cl. .................. 264/40.7; 83/26; 425/312; 264/630; 264/177.17; 264/145; 198/461.1; 198/571; 198/572; 198/575

(58) Field of Classification Search .................. 264/630, 264/631, 40.7; 83/26; 198/461.1, 461.2; 425/312
See application file for complete search history.

(56) References Cited

U.S. PATENT DOCUMENTS 2,303,888 A * 12/1942 Miller ........................ 264/148

2,916,792 A * 12/1959 Crook et al. ................ 264/40.7

(Continued)

FOREIGN PATENT DOCUMENTS

DE          3713343          11/1987

(Continued)

OTHER PUBLICATIONS

International Search Report, PCT/JP2006/307645, mailed Jul. 18, 2006.
Extended European Search Report on EP 07002324.7.

*Primary Examiner*—Steven P Griffin
*Assistant Examiner*—Erin Snelting
(74) *Attorney, Agent, or Firm*—Ditthavong Mori & Steiner, P.C.

(57) ABSTRACT

A molded body cutting apparatus according to the present invention comprising a first conveyer member that conveys an extrusion-molded pillar-shaped ceramic molded body a cutting member that moves in a direction parallel to a movement direction of the above mentioned first conveyer member while moving also in a vertical direction, and cuts the above mentioned ceramic molded body to a predetermined length by passing through the interior of the above mentioned ceramic molded body and a second conveyer member that conveys a cut ceramic molded body cut to a predetermined length by the above mentioned cutting member, wherein a conveyance speed of the above mentioned first conveyer member and a movement speed of the above mentioned cutting member in the above mentioned parallel direction are almost the same, before the above mentioned ceramic molded body is cut, and each of the conveyance speed of the above mentioned first conveyer member, the movement speed of the above mentioned cutting member in the above mentioned parallel direction, and a conveyance speed of the above mentioned second conveyer member becomes faster toward the latter, after the above mentioned ceramic molded body is cut.

42 Claims, 4 Drawing Sheets

U.S. PATENT DOCUMENTS

| | | | | |
|---|---|---|---|---|
| 3,075,630 | A * | 1/1963 | Fisk | 198/572 |
| 4,179,959 | A * | 12/1979 | Lingl, Jr. | 83/37 |
| 4,311,073 | A * | 1/1982 | Brugger et al. | 83/23 |
| 4,674,376 | A | 6/1987 | Hattori et al. | |
| 5,914,187 | A | 6/1999 | Naruse et al. | |
| 6,669,751 | B1 | 12/2003 | Ohno et al. | |
| 6,711,979 | B1 | 3/2004 | Miyakawa et al. | |
| 7,112,233 | B2 | 9/2006 | Ohno et al. | |
| 7,309,370 | B2 | 12/2007 | Kudo et al. | |
| 7,332,014 | B2 | 2/2008 | Ono et al. | |
| 7,341,614 | B2 | 3/2008 | Hayashi et al. | |
| 7,348,049 | B2 | 3/2008 | Yoshida | |
| 7,387,829 | B2 | 6/2008 | Ohno et al. | |
| 7,393,376 | B2 | 7/2008 | Taoka et al. | |
| 7,396,586 | B2 | 7/2008 | Ohno et al. | |
| 7,427,308 | B2 | 9/2008 | Taoka et al. | |
| 7,427,309 | B2 | 9/2008 | Ohno et al. | |
| 7,438,967 | B2 | 10/2008 | Fujita | |
| 7,449,427 | B2 | 11/2008 | Ohno et al. | |
| 7,462,216 | B2 | 12/2008 | Kunieda et al. | |
| 7,473,465 | B2 | 1/2009 | Ohno et al. | |
| 2002/0020275 | A1 | 2/2002 | Fukuta et al. | |
| 2004/0051196 | A1 * | 3/2004 | Otsuka et al. | 264/41 |
| 2004/0161596 | A1 | 8/2004 | Taoka et al. | |
| 2004/0195719 | A1 | 10/2004 | Ishii et al. | |
| 2005/0109023 | A1 | 5/2005 | Kudo et al. | |
| 2005/0153099 | A1 | 7/2005 | Yamada | |
| 2005/0169819 | A1 | 8/2005 | Shibata | |
| 2005/0175514 | A1 | 8/2005 | Ohno | |
| 2005/0180898 | A1 | 8/2005 | Yamada | |
| 2005/0247038 | A1 | 11/2005 | Takahashi | |
| 2005/0272602 | A1 | 12/2005 | Ninomiya | |
| 2006/0029897 | A1 | 2/2006 | Saijo et al. | |
| 2006/0029898 | A1 | 2/2006 | Saijo et al. | |
| 2006/0043562 | A1 | 3/2006 | Watanabe | |
| 2006/0051556 | A1 | 3/2006 | Ohno et al. | |
| 2006/0073970 | A1 | 4/2006 | Yamada | |
| 2006/0108347 | A1 | 5/2006 | Koyama et al. | |
| 2006/0118546 | A1 | 6/2006 | Saijo | |
| 2006/0166820 | A1 | 7/2006 | Ogyu et al. | |
| 2006/0210765 | A1 | 9/2006 | Ohno et al. | |
| 2006/0216466 | A1 | 9/2006 | Yoshida | |
| 2006/0216467 | A1 | 9/2006 | Yoshida | |
| 2006/0222812 | A1 | 10/2006 | Koyama et al. | |
| 2006/0225390 | A1 | 10/2006 | Yoshida | |
| 2006/0230732 | A1 | 10/2006 | Kunieda | |
| 2006/0245465 | A1 | 11/2006 | Saijo et al. | |
| 2006/0269722 | A1 | 11/2006 | Yamada | |
| 2007/0020155 | A1 | 1/2007 | Ohno et al. | |
| 2007/0028575 | A1 | 2/2007 | Ohno et al. | |
| 2007/0044444 | A1 | 3/2007 | Oshimi | |
| 2007/0068128 | A1 | 3/2007 | Oshimi et al. | |
| 2007/0085233 | A1 | 4/2007 | Yamada | |
| 2007/0116908 | A1 | 5/2007 | Ohno et al. | |
| 2007/0126160 | A1 | 6/2007 | Takahashi | |
| 2007/0128405 | A1 | 6/2007 | Sakaguchi et al. | |
| 2007/0130897 | A1 | 6/2007 | Sakaguchi et al. | |
| 2007/0169453 | A1 | 7/2007 | Hayakawa | |
| 2007/0175060 | A1 | 8/2007 | Idei et al. | |
| 2007/0178275 | A1 | 8/2007 | Takahashi | |
| 2007/0190350 | A1 | 8/2007 | Ohno et al. | |
| 2007/0196620 | A1 | 8/2007 | Ohno et al. | |
| 2007/0199205 | A1 | 8/2007 | Hoshino et al. | |
| 2007/0204580 | A1 | 9/2007 | Kunieda | |
| 2007/0212517 | A1 | 9/2007 | Ohno et al. | |
| 2007/0243283 | A1 | 10/2007 | Yamamura et al. | |
| 2007/0262498 | A1 | 11/2007 | Saijo et al. | |
| 2007/0293392 | A1 | 12/2007 | Ohno et al. | |
| 2008/0067725 | A1 | 3/2008 | Naruse et al. | |
| 2008/0084010 | A1 | 4/2008 | Naruse et al. | |
| 2008/0088072 | A1 | 4/2008 | Kobayashi | |
| 2008/0106008 | A1 | 5/2008 | Kasai et al. | |
| 2008/0106009 | A1 | 5/2008 | Naruse et al. | |
| 2008/0116200 | A1 | 5/2008 | Kawai et al. | |
| 2008/0120950 | A1 | 5/2008 | Ohno et al. | |
| 2008/0136053 | A1 | 6/2008 | Kuribayashi et al. | |
| 2008/0136062 | A1 | 6/2008 | Kasai et al. | |
| 2008/0138567 | A1 | 6/2008 | Ninomiya et al. | |
| 2008/0157445 | A1 | 7/2008 | Kawai et al. | |
| 2008/0174039 | A1 | 7/2008 | Saijo et al. | |
| 2008/0190081 | A1 | 8/2008 | Oshimi | |
| 2008/0190083 | A1 | 8/2008 | Oshimi | |
| 2008/0213485 | A1 | 9/2008 | Shibata | |
| 2008/0236115 | A1 | 10/2008 | Sakashita | |
| 2008/0236122 | A1 | 10/2008 | Ito | |
| 2008/0236724 | A1 | 10/2008 | Higuchi | |
| 2008/0241015 | A1 | 10/2008 | Kudo et al. | |
| 2008/0241444 | A1 | 10/2008 | Oshimi | |
| 2008/0241466 | A1 | 10/2008 | Saito et al. | |
| 2008/0284067 | A1 | 11/2008 | Naruse et al. | |
| 2008/0305259 | A1 | 12/2008 | Saijo | |
| 2008/0318001 | A1 | 12/2008 | Sakakibara | |
| 2009/0004431 | A1 | 1/2009 | Ninomiya | |

FOREIGN PATENT DOCUMENTS

| | | |
|---|---|---|
| DE | 3618417 | 12/1987 |
| DE | 19953157 | 5/2000 |
| EP | 0202010 | 11/1986 |
| EP | 0205231 | 12/1986 |
| JP | 61-241094 | 10/1986 |
| JP | 03195622 A * | 8/1991 |
| JP | 11-216714 | 8/1999 |
| JP | 2000-296497 | 10/2000 |
| JP | 2001-096524 | 4/2001 |

* cited by examiner

A-A line cross-sectional view

METHOD FOR CUTTING CERAMIC MOLDED BODY AND METHOD MANUFACTURING HONEYCOMB STRUCTURED BODY

CROSS-REFERENCE TO RELATED APPLICATIONS

This application claims priority of PCT/JP2006/307645 filed on Apr. 11, 2006. The contents of this application are incorporated herein by reference in their entirety.

BACKGROUND OF THE INVENTION

1. Field of the Invention

The present invention relates to a molded body cutting apparatus, a method for cutting a ceramic molded body, and a method for manufacturing a honeycomb structured body.

2. Discussion of the Background

Harm to the environment and the human body caused by particulates such as soot contained in exhaust gas discharged from the internal combustion engines of buses, trucks and other vehicles, construction equipment and the like has recently become a problem.

To remedy this, there has been currently proposed numerous kinds of ceramic filters using a honeycomb structured body made of porous ceramic as a filter for capturing particulates contained in exhaust gas, thereby purifying the exhaust gas.

Conventionally, when manufacturing a honeycomb structured body, for instance, first a ceramic powder, a binder, and a liquid dispersal medium are combined to prepare a wet mixture. Then the wet mixture is extrusion-molded continuously with dice, and the extrusion-molded body which has yet to be cut is then cut to a predetermined length using a molded body cutting apparatus. Thus a rectangular pillar-shaped honeycomb molded body is produced.

Next, the honeycomb molded body attained above is dried, and afterward, plugs are filled into either end of predetermined cells using the plug material layer in order to achieve a sealed state of the cells. After the sealed state has been achieved, degreasing and firing treatment is carried out thereon, thus manufacturing the honeycomb fired body.

Afterward, a sealing material paste is applied onto the side faces of the honeycomb fired body, and the honeycomb fired bodies are adhered together to manufacture an aggregate of the honeycomb fired bodies comprising a multitude of the honeycomb fired bodies being bound together by interposing a sealing material layer (the adhesive layer). Excision is then carried out on the resulting aggregate of honeycomb fired bodies using a cutting machine or the like to form a ceramic block of a predetermined shape, such as a cylindrical or cylindroid shape or the like. Finally, a sealing material paste is applied over the outer periphery of the ceramic block to form a sealing material layer (a coat layer), thereby finishing the manufacture of the honeycomb structured body.

Here disclosed as an apparatus for cutting an uncut ceramic molded body continuously extrusion-molded is an automatic cutting apparatus that supplies a receptacle underneath the molded body extruded from an extrusion-molding machine, and places the extrusion-molded body onto the receptacle and moves a cutting piece at a speed and in a direction both identical to the movement speed and movement direction of the extrusion-molded body while detecting the space between receptacles by a space detection device, to cut the extrusion-molded body in the direction perpendicular to the movement direction (see, for example, JP-A S61-241094).

The contents of JP-A S61-241094 are incorporated herein by reference in their entirety.

SUMMARY OF THE INVENTION

A molded body cutting apparatus according to the first aspect of the present invention is a molded body cutting apparatus comprising:

a first conveyer member that conveys an extrusion-molded pillar-shaped ceramic molded body;

a cutting member that moves in a direction parallel to a movement direction of the first conveyer member while moving also in a vertical direction, and cuts the ceramic molded body to a predetermined length by passing through the interior of the ceramic molded body; and a second conveyer member that conveys a cut ceramic molded body cut to a predetermined length by the cutting member, wherein a conveyance speed of the first conveyer member and a movement speed of the cutting member in the parallel direction are almost the same, before the ceramic molded body is cut, and each of the conveyance speed of the first conveyer member, the movement speed of the cutting member in the parallel direction, and a conveyance speed of the second conveyer member becomes faster toward the latter, after the ceramic molded body is cut.

In the molded body cutting apparatus according to the first aspect of the present invention, the cutting member is desirably a filamentous body, and the filamentous body is desirably a metallic filament whose periphery is coated with a resin. Further, the resin coating the periphery of the metallic filament is desirably any one of nylon, polyester, polyvinyl alcohol and polyacryl.

The molded body cutting apparatus according to the first aspect of the present invention is desirably configured to move the filamentous body, each time the ceramic molded body is cut.

In the molded body cutting apparatus according to the first aspect of the present invention, a diameter of the filamentous body is desirably at least about 0.05 mm and at most about 0.5 mm.

In the molded body cutting apparatus according to the first aspect of the present invention, a tension of the filamentous body is desirably at least about 2 N and at most about 8 N.

The molded body cutting apparatus according to the first aspect of the present invention desirably further comprising: a ball screw that moves the cutting member in the parallel direction; and a cylinder that moves the cutting member in the vertical direction.

The molded body cutting apparatus according to the first aspect of the present invention desirably further comprises a cutting unit formed of a base that comprises a sender bobbin that sends out the cutting member, a reel-in bobbin that reels in the cutting member, and a plurality of pulleys configured to guide the cutting member from the sender bobbin through a cutting member support portion to the reel-in bobbin and the cutting member.

In the molded body cutting apparatus according to the first aspect of the present invention, the cutting unit desirably comprises a mechanism which is configured to set the cutting member into motion in a manner so as to pass through the interior of the extrusion-molded pillar-shaped ceramic molded body thereby cutting it in a manner orthogonal to the longitudinal direction of the extrusion-molded pillar-shaped ceramic molded body, while moving synchronized with the extrusion-molded pillar-shaped ceramic molded body.

The molded body cutting apparatus according to the first aspect of the present invention desirably further comprises a mechanism in which after the pillar-shaped ceramic molded body is cut, the sender bobbin and the reel-in bobbin come into action to move the cutting member just a predetermined length and replacing the cutting member with a new cutting member, and the new cutting member which is newly placed cuts the pillar-shaped ceramic molded body.

In the molded body cutting apparatus according to the first aspect of the present invention, the cutting unit desirably carries out a cutting of the next extrusion-molded pillar-shaped ceramic molded body using a new cutting member in each single execution of cutting with the cutting member.

The molded body cutting apparatus according to the first aspect of the present invention desirably further comprises a mechanism in which a constitution material of the ceramic molded body that has adhered to the cutting member is wiped off after cutting the extrusion-molded pillar-shaped ceramic molded body.

In the molded body cutting apparatus according to the first aspect of the present invention, a contact portion of each of the first conveyer member and the second conveyer member that makes contact with the ceramic molded body is desirably any one of natural rubber, nylon, urethane, and polyester.

In the molded body cutting apparatus according to the first aspect of the present invention, a lowering speed of the cutting member is desirably at least about 0.6 m/min and at most about 30 m/min.

In the molded body cutting apparatus according to the first aspect of the present invention, speed ratios among the conveyance speed of the first conveyer member, the movement speed of the cutting member in the parallel direction, and the conveyance speed of the second conveyer member after cutting the ceramic molded body are desirably (the movement speed of the cutting member in the parallel direction/the conveyance speed of the first conveyer member) =at least about 3 and at most about 7, and (the conveyance speed of the second conveyer member/the conveyance speed of the first conveyer member)=at least about 5 and at most about 10.

In the molded body cutting apparatus according to the first aspect of the present invention, a passage sensor desirably detects a passage of the extrusion-molded pillar-shaped ceramic molded body and transmits a 'passage start signal' to a cutting control device, and a receipt of the passage start signal by the cutting control device causes the start of an operation of the cutting member.

In the molded body cutting apparatus according to the first aspect of the present invention, a disposal location of the passage sensor is desirably changeable.

A method for cutting a ceramic molded body according to the second aspect of the present invention is a method for cutting a ceramic molded body, comprising cutting an extrusion-molded pillar-shaped ceramic molded body to a predetermined length by using a molded body cutting apparatus, wherein the molded body cutting apparatus comprises:

a first conveyer member that conveys an extrusion-molded uncut pillar-shaped ceramic molded body;

a cutting member that moves in a direction parallel to a movement direction of the first conveyer member while moving also in a vertical direction, and cuts the ceramic molded body to a predetermined length by passing through the interior of the ceramic molded body; and a second conveyer member that conveys a ceramic molded body cut to a predetermined length by the cutting member, a conveyance speed of the first conveyer member and a movement speed of the cutting member in the parallel direction being almost the same, before the ceramic molded body is cut, and each of the conveyance speed of the first conveyer member, the movement speed of the cutting member in the parallel direction, and a conveyance speed of the second conveyer member becoming faster toward the latter, after the ceramic molded body is cut.

In the method for cutting a ceramic molded body according to the second aspect of the present invention, the cutting member is desirably a filamentous body, and the filamentous body is desirably a metallic filament whose periphery is coated with a resin. Further, the resin coating the periphery of the metallic filament is desirably any one of nylon, polyester, polyvinyl alcohol and polyacryl.

In the method for cutting a ceramic molded body according to the second aspect of the present invention, the molded body cutting apparatus is desirably further configured to move the filamentous body, each time the ceramic molded body is cut.

In the method for cutting a ceramic molded body according to the second aspect of the present invention, a diameter of the filamentous body is desirably at least about 0.05 mm and at most about 0.5 mm.

In the method for cutting a ceramic molded body according to the second aspect of the present invention, a tension of the filamentous body is desirably at least about 2 N and at most about 8 N.

In the method for cutting a ceramic molded body according to the second aspect of the present invention, the molded body cutting apparatus desirably further comprises: a ball screw that moves the cutting member in the parallel direction; and a cylinder that moves the cutting member in the vertical direction.

In the method for cutting a ceramic molded body according to the second aspect of the present invention, the molded body cutting apparatus desirably further comprises a cutting unit formed of: a base that comprises a sender bobbin that sends out the cutting member, a reel-in bobbin that reels in the cutting member, and a plurality of pulleys configured to guide the cutting member from the sender bobbin through a cutting member support portion to the reel-in bobbin; and the cutting member.

In the method for cutting a ceramic molded body according to the second aspect of the present invention, the cutting unit desirably comprises a mechanism which is configured to set the cutting member into motion in a manner so as to pass through the interior of the extrusion-molded pillar-shaped ceramic molded body thereby cutting it in a manner orthogonal to the longitudinal direction of the extrusion-molded pillar-shaped ceramic molded body while moving synchronized with the extrusion-molded pillar-shaped ceramic molded body.

In the method for cutting a ceramic molded body according to the second aspect of the present invention, the molded body cutting apparatus desirably further comprises a mechanism in which after the pillar-shaped ceramic molded body is cut, the sender bobbin and the reel-in bobbin come into action to move the cutting member just a predetermined length and replacing the cutting member with a new cutting member, and the new cutting member which is newly placed cuts the pillar-shaped ceramic molded body.

In the method for cutting a ceramic molded body according to the second aspect of the present invention, the cutting unit desirably carries out a cutting of the next extrusion-molded pillar-shaped ceramic molded body using a new cutting member in each single execution of cutting with the cutting member.

In the method for cutting a ceramic molded body according to the second aspect of the present invention, the molded body cutting apparatus desirably further comprises a mechanism in which a constitution material of the ceramic molded body that has adhered to the cutting member is wiped off after cutting the extrusion-molded pillar-shaped ceramic molded body.

In the method for cutting a ceramic molded body according to the second aspect of the present invention, a contact portion of each of the first conveyer member and the second conveyer member that makes contact with the ceramic molded body is desirably any one of natural rubber, nylon, urethane, and polyester.

In the method for cutting a ceramic molded body according to the second aspect of the present invention, a lowering speed of the cutting member is desirably at least about 0.6 m/min and at most about 30 m/min.

In the method for cutting a ceramic molded body according to the second aspect of the present invention, speed ratios among the conveyance speed of the first conveyer member, the movement speed of the cutting member in the parallel direction, and the conveyance speed of the second conveyer member after cutting the ceramic molded body are desirably (the movement speed of the cutting member in the parallel direction/the conveyance speed of the first conveyer member) =at least about 3 and at most about 7, and (the conveyance speed of the second conveyer member/the conveyance speed of the first conveyer member)=at least about 5 and at most about 10.

In the method for cutting a ceramic molded body according to the second aspect of the present invention, the molded body cutting apparatus further comprises a passage sensor and a cutting control device, the passage sensor desirably detects a passage of the extrusion-molded pillar-shaped ceramic molded body and transmits a 'passage start signal' to the cutting control device, and a receipt of the passage start signal by the cutting control device causes the start of an operation of the cutting member.

In the method for cutting a ceramic molded body according to the second aspect of the present invention, the molded body cutting apparatus is desirably capable of changing a disposal location of the passage sensor.

The method for manufacturing a honeycomb structured body according to the third aspect of the present invention is a method for manufacturing a honeycomb structured body, comprising:

producing a pillar-shaped honeycomb molded body having a multiplicity of cells placed in parallel to each other in the longitudinal direction with a cell wall therebetween by extrusion-molding a ceramic raw material;

cutting the honeycomb molded body to a predetermined length using a molded body cutting apparatus; and firing the honeycomb molded body to manufacture a honeycomb structured body comprising a honeycomb fired body, wherein the molded body cutting apparatus comprises:

a first conveyer member that conveys the extrusion-molded uncut pillar-shaped honeycomb molded body;

a cutting member that moves in a direction parallel to a movement direction of the first conveyer member while moving also in a vertical direction, and cuts the honeycomb molded body to a predetermined length by passing through the interior of the honeycomb molded body; and a second conveyer member that conveys a honeycomb molded body cut to a predetermined length by the cutting member, a conveyance speed of the first conveyer member and a movement speed of the cutting member in the parallel direction being almost the same, before the honeycomb molded body is cut, and each of the conveyance speed of the first conveyer member, the movement speed of the cutting member in the parallel direction, and a conveyance speed of the second conveyer member becoming faster toward the latter, after the honeycomb molded body is cut.

In the method for manufacturing a honeycomb structured body according to the third aspect of the present invention, the cutting member is desirably a filamentous body, and the filamentous body is desirably a metallic filament whose periphery is coated with a resin. Further, the resin coating the periphery of the metallic filament is desirably any one of nylon, polyester, polyvinyl alcohol and polyacryl.

In the method for manufacturing a honeycomb structured body according to the third aspect of the present invention, the molded body cutting apparatus is desirably further configured to move the filamentous body, each time the honeycomb molded body is cut.

In the method for manufacturing a honeycomb structured body according to the third aspect of the present invention, a diameter of the filamentous body is desirably at least about 0.05 mm and at most about 0.5 mm.

In the method for manufacturing a honeycomb structured body according to the third aspect of the present invention, a tension of the filamentous body is desirably at least about 2 N and at most about 8 N.

In the method for manufacturing a honeycomb structured body according to the third aspect of the present invention, the molded body cutting apparatus desirably further comprises: a ball screw that moves the cutting member in the parallel direction; and a cylinder that moves the cutting member in the vertical direction.

In the method for manufacturing a honeycomb structured body according to the third aspect of the present invention, the molded body cutting apparatus desirably further comprises a cutting unit formed of: a base that comprises a sender bobbin that sends out the cutting member, a reel-in bobbin that reels in the cutting member, and a plurality of pulleys configured to guide the cutting member from the sender bobbin through a cutting member support portion to the reel-in bobbin; and the cutting member.

In the method for manufacturing a honeycomb structured body according to the third aspect of the present invention, the cutting unit desirably comprises a mechanism which is configured to set the cutting member into motion in a manner so as to pass through the interior of the extrusion-molded pillar-shaped honeycomb molded body thereby cutting it in a manner orthogonal to the longitudinal direction of the extrusion-molded pillar-shaped honeycomb molded body, while moving synchronized with the extrusion-molded pillar-shaped honeycomb molded body.

In the method for manufacturing a honeycomb structured body according to the third aspect of the present invention, the molded body cutting apparatus desirably further comprises a mechanism in which after the pillar-shaped honeycomb molded body is cut, the sender bobbin and the reel-in bobbin come into action to move the cutting member just a predetermined length and replacing the cutting member with a new cutting member, and the new cutting member which is newly placed cuts the pillar-shaped honeycomb molded body.

In the method for manufacturing a honeycomb structured body according to the third aspect of the present invention, the cutting unit desirably carries out a cutting of the next extrusion-molded pillar-shaped honeycomb molded body using a new cutting member in each single execution of cutting with the cutting member.

In the method for manufacturing a honeycomb structured body according to the third aspect of the present invention, the molded body cutting apparatus desirably further comprises a mechanism in which a constitution material of the honeycomb molded body that has adhered to the cutting member is wiped off after cutting the extrusion-molded pillar-shaped honeycomb molded body.

In the method for manufacturing a honeycomb structured body according to the third aspect of the present invention, a contact portion of each of the first conveyer member and the second conveyer member that makes contact with the honeycomb molded body is desirably any one of natural rubber, nylon, urethane, and polyester.

In the method for manufacturing a honeycomb structured body according to the third aspect of the present invention, a lowering speed of the cutting member is desirably at least about 0.6 m/min and at most about 30 m/min.

In the method for manufacturing a honeycomb structured body according to the third aspect of the present invention, speed ratios among the conveyance speed of the first conveyer member, the movement speed of the cutting member in the parallel direction, and the conveyance speed of the second conveyer member after cutting the honeycomb molded body are desirably (the movement speed of the cutting member in the parallel direction/the conveyance speed of the first conveyer member) =least about 3 and at most about 7, and (the conveyance speed of the second conveyer member/the conveyance speed of the first conveyer member)=at least about 5 and at most about 10.

In the method for manufacturing a honeycomb structured body according to the third aspect of the present invention, the molded body cutting apparatus further comprises a passage sensor and a cutting control device, the passage sensor desirably detects a passage of the extrusion-molded pillar-shaped honeycomb molded body and transmits a 'passage start signal' to the cutting control device, and a receipt of the passage start signal by the cutting control device causes the start of an operation of the cutting member.

In the method for manufacturing a honeycomb structured body according to the third aspect of the present invention, the molded body cutting apparatus is desirably capable of changing a disposal location of the passage sensor.

In the method for manufacturing a honeycomb structured body according to the third aspect of the present invention, the honeycomb structured body is desirably a honeycomb fired body having a plurality of cells placed in parallel to each other in the longitudinal direction with a cell wall therebetween, either of end portions of each of the cells being sealed.

In the method for manufacturing a honeycomb structured body according to the third aspect of the present invention, the honeycomb structure body desirably has a structure in which a plurality of the honeycomb fired bodies are bound together by interposing a sealing material layer.

In the method for manufacturing a honeycomb structured body according to the third aspect of the present invention, the honeycomb structured body desirably comprises a single piece of the honeycomb fired body.

In the method for manufacturing a honeycomb structured body according to the third aspect of the present invention, the honeycomb structured body is desirably a honeycomb fired body having a plurality of cells placed in parallel to each other in the longitudinal direction with a cell wall therebetween, and the cells being not sealed.

In the method for manufacturing a honeycomb structured body according to the third aspect of the present invention, the honeycomb structured body desirably has a structure in which a plurality of the honeycomb fired bodies are bound together by interposing a sealing material layer.

In the method for manufacturing a honeycomb structured body according to the third aspect of the present invention, the honeycomb structured body desirably comprises a single piece of the honeycomb fired body.

DESCRIPTION OF THE EMBODIMENTS

Figure 1A:
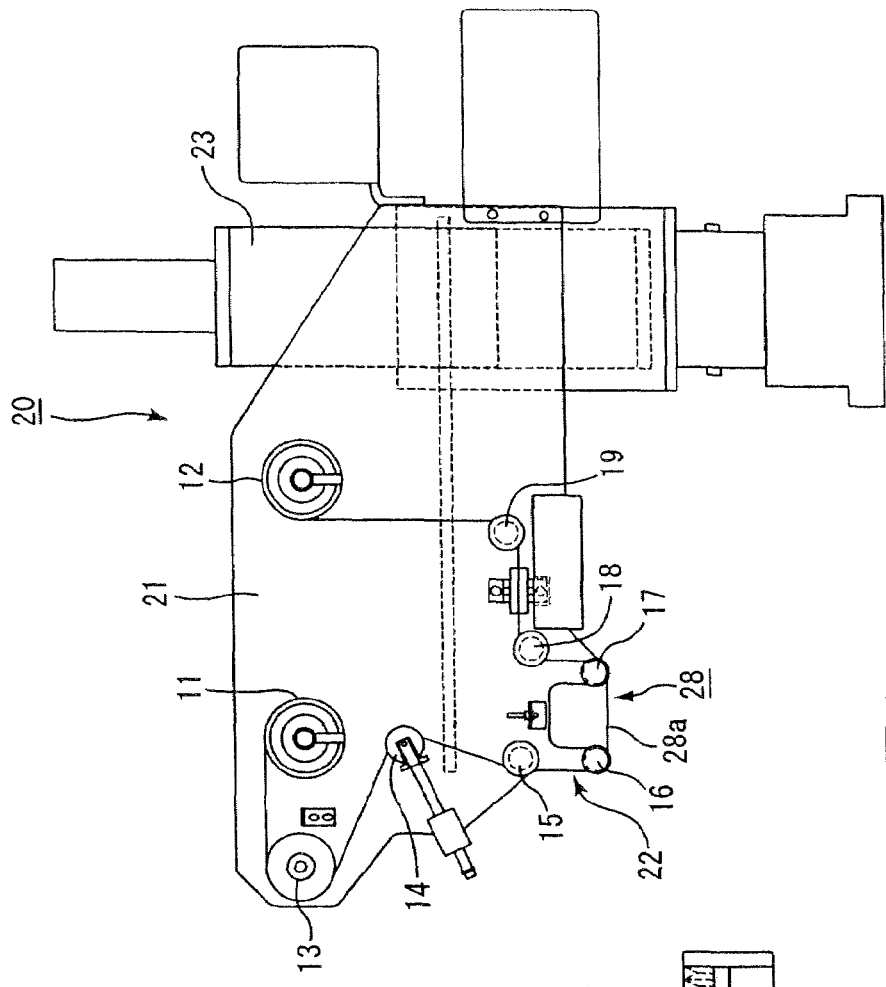
FIG. 1A is a side view showing an example of an embodiment of a cutting unit constituting the molded body cutting apparatus according to one embodiment of the first aspect of the present invention.

The molded body cutting apparatus according to the embodiment of the first aspect of the present invention is a molded body cutting apparatus comprising:

a first conveyer member that conveys an extrusion-molded pillar-shaped ceramic molded body;

a cutting member that moves in a direction parallel to a movement direction of the above mentioned first conveyer member while moving also in a vertical direction, and cuts the above mentioned ceramic molded body to a predetermined length by passing through the interior of the above mentioned ceramic molded body; and a second conveyer member that conveys a cut ceramic molded body cut to a predetermined length by the above mentioned cutting member, wherein a conveyance speed of the above mentioned first conveyer member and a movement speed of the above mentioned cutting member in the above mentioned parallel direction are almost the same, before the above mentioned ceramic molded body is cut, and each of the conveyance speed of the above mentioned first conveyer member, the movement speed of the above mentioned cutting member in the above mentioned parallel direction, and a conveyance speed of the above mentioned second conveyer member becomes faster toward the latter, after the above mentioned ceramic molded body is cut.

In the molded body cutting apparatus according to the embodiment of the first aspect of the present invention, because there is provided the cutting member that moves in the parallel direction to the movement direction of the first conveyer member that conveys a ceramic molded body and in the vertical direction, and moves at a speed almost the same to the movement speed of the first conveyer member, it becomes easier to cut a ceramic molded body in such a manner to form a cut face orthogonal to the longitudinal direction.

After the above mentioned ceramic molded body is cut, since the speed of each of the constituent members, that is, the movement speed of the first conveyer member (1), the movement speed of the cutting member in the above mentioned parallel direction (2), and the movement speed of the second conveyer member (3) is set to satisfy a relationship of (1)<(2)<(3), it becomes difficult to make contact between the cut molded body and the cutting member when the cutting member rises. Thus it becomes easier to prevent the defect of deformation and the like from occurring on the cut face of the molded body, and in particular, in a honeycomb molded body having cells partitioned by extremely thin cell walls, because it becomes difficult to occur cell deformation, cracking, or the like, and because it becomes difficult for constitution material that has adhered to the cutting member during cutting to come to re-adhere to the cut face thus clogging the cells, it becomes easier to cut the molded body precisely and to attain a molded body having a cut face of a favorable surface state.

If the above mentioned cutting member is a filamentous body, the area of contact with the ceramic molded body is extremely small and thus there is no burden of unnecessary stress or the like on the ceramic molded body, it becomes easier to cut a ceramic molded body in a manner that does not deform the ceramic molded body during cutting, and the cutting can be executed with ease.

In particular, if the above mentioned filamentous body is constituted of a metallic filament (also referred to as "metal wire"), it becomes easier to reduce the frequency of replacement of the filament due to wearing because of the high degree of durability and strength of the filament, and also, if there is a resin coated there over the periphery of the metallic filament, it becomes easier for adherence of the constitution material of the ceramic molded body to the filamentous body during and after cutting to be effectively restrained, thereby making it easier to effectively prevent adherence of the constitution material to the cut face.

And as described above, while it becomes easier for the adherence of the above mentioned constitution material to the cut face to be effectively restrained by using the resin coated filamentous body, if the molded body cutting apparatus is further configured to move the filamentous body, it becomes easier to replace the cutting member with a completely new cutting member thereby making it easier to satisfactorily cut the ceramic molded body with no occurrences of wrong cuttings, defective cuttings, off-specification products or the like.

If the molded body cutting apparatus according to the embodiment of the first aspect of the present invention comprises the ball screw that moves the above mentioned cutting member in the above mentioned parallel direction, and the cylinder that moves the above mentioned cutting member in the vertical direction, it becomes easier for the above mentioned cutting member to move in a smooth manner in the above mentioned parallel direction and the vertical direction, thereby making it easier to improve on the efficiency of a manufacturing line including full automation of the cutting.

The method for cutting a ceramic molded body according to the embodiment of the second aspect of the present invention is a method for cutting a ceramic molded body, comprising cutting an extrusion-molded pillar-shaped ceramic molded body to a predetermined length by using a molded body cutting apparatus, wherein the above mentioned molded body cutting apparatus comprises:

a first conveyer member that conveys an extrusion-molded uncut pillar-shaped ceramic molded body;

a cutting member that moves in a direction parallel to a movement direction of the above mentioned first conveyer member while moving also in a vertical direction, and cuts the above mentioned ceramic molded body to a predetermined length by passing through the interior of the above mentioned ceramic molded body; and a second conveyer member that conveys a ceramic molded body cut to a predetermined length by the above mentioned cutting member, a conveyance speed of the above mentioned first conveyer member and a movement speed of the above mentioned cutting member in the above mentioned parallel direction being almost the same, before the above mentioned ceramic molded body is cut, and each of the conveyance speed of the above mentioned first conveyer member, the movement speed of the above mentioned cutting member in the above mentioned parallel direction, and a conveyance speed of the above mentioned second conveyer member becoming faster toward the latter, after the above mentioned ceramic molded body is cut.

In the present specification, the shape indicated by the word "pillar" refers to any desired shape of a pillar including a round pillar, an oval pillar, a polygonal pillar and the like.

In the method for cutting a ceramic molded body according to the embodiment of the second aspect of the present invention, because an extrusion-molded ceramic molded body is cut using the molded body cutting apparatus according to the embodiment of the first aspect of the present invention, it becomes easier to execute cutting in a direction perpendicular to the longitudinal direction of the ceramic molded body in an efficient and easy manner. Also, because the speed of each of the first conveyer member, the cutting member, and the second conveyer member satisfies a predetermined relationship, it becomes difficult to make contact of the cutting member with the ceramic molded body when the cutting member rises after cutting. Therefore, it becomes easier to prevent the occurrence of deformations, cracking, and the like on the cut face of the ceramic molded body, and in a case that the ceramic molded body is the above mentioned honeycomb molded body, it becomes easier to prevent the clogging of the cells by the constitution material of the ceramic molded body while it becomes easier to prevent the occurrence of deformations, cracking, and the like of the cells.

The method for manufacturing a honeycomb structured body according to the embodiment of the third aspect of the present invention is a method for manufacturing a honeycomb structured body, comprising:

producing a pillar-shaped honeycomb molded body having a multiplicity of cells placed in parallel to each other in the longitudinal direction with a cell wall therebetween by extrusion-molding a ceramic raw material;

cutting the above mentioned honeycomb molded body to a predetermined length using a molded body cutting apparatus; and firing the above mentioned honeycomb molded body to manufacture a honeycomb structured body comprising a honeycomb fired body, wherein the above mentioned molded body cutting apparatus comprises:

a first conveyer member that conveys the extrusion-molded uncut pillar-shaped honeycomb molded body;

a cutting member that moves in a direction parallel to a movement direction of the above mentioned first conveyer member while moving also in a vertical direction, and cuts the above mentioned honeycomb molded body to a predetermined length by passing through the interior of the above mentioned honeycomb molded body; and a second conveyer member that conveys a honeycomb molded body cut to a predetermined length by the above mentioned cutting member, a conveyance speed of the above mentioned first conveyer member and a movement speed of the above mentioned cutting member in the above mentioned parallel direction being almost the same, before the above mentioned honeycomb molded body is cut, and each of the conveyance speed of the above mentioned first conveyer member, the movement speed of the above mentioned cutting member in the above mentioned parallel direction, and a conveyance speed of the above mentioned second conveyer member becoming faster toward the latter, after the above mentioned honeycomb molded body is cut.

In the method for manufacturing a honeycomb structured body according to the embodiment of the third aspect of the present invention, because it becomes easier to efficiently produce a honeycomb molded body having a cut face orthogonal to the longitudinal direction and of a favorable surface state by cutting a honeycomb molded body that extrudes from the extrusion-molding machine and has been produced in the extrusion-molding by using the molded body cutting apparatus according to the embodiment of the first aspect of the present invention, it becomes easier to improve the efficiency of the manufacturing line, and reduce product losses and the like.

In the present description, among faces forming an outer shape in any form of the honeycomb molded body, the honeycomb fired body, and the honeycomb structured body, a face at which the cells are exposed is termed 'end face', while a face other than the end face is termed 'side face'.

Hereinafter, in the present description, the term 'movement speed of the cutting member in the above mentioned parallel direction' is used to refer to the speed of when the cutting member moves in the direction parallel to the movement direction of the first conveyer member.

First, description will be put forth in regard to the embodiment of the molded body cutting apparatus according to the embodiment of the first aspect of the present invention and the embodiment of the method for cutting a ceramic molded body according to the second aspect of the present invention using the drawings as a reference.

The object of cutting by the molded body cutting apparatus according to the embodiment of the first aspect of the present invention is not particularly limited as long as the object is a molded body attainable by extrusion-molding. For example, a honeycomb molded body having a multitude of cells running through in the longitudinal direction is acceptable, as a simple tubiform molded body is also acceptable as the subject of cutting. Herein below, description will be given in regard to a ceramic molded body (a honeycomb molded body) having a honeycomb structure as an example of a ceramic molded body.

Figure 1B:
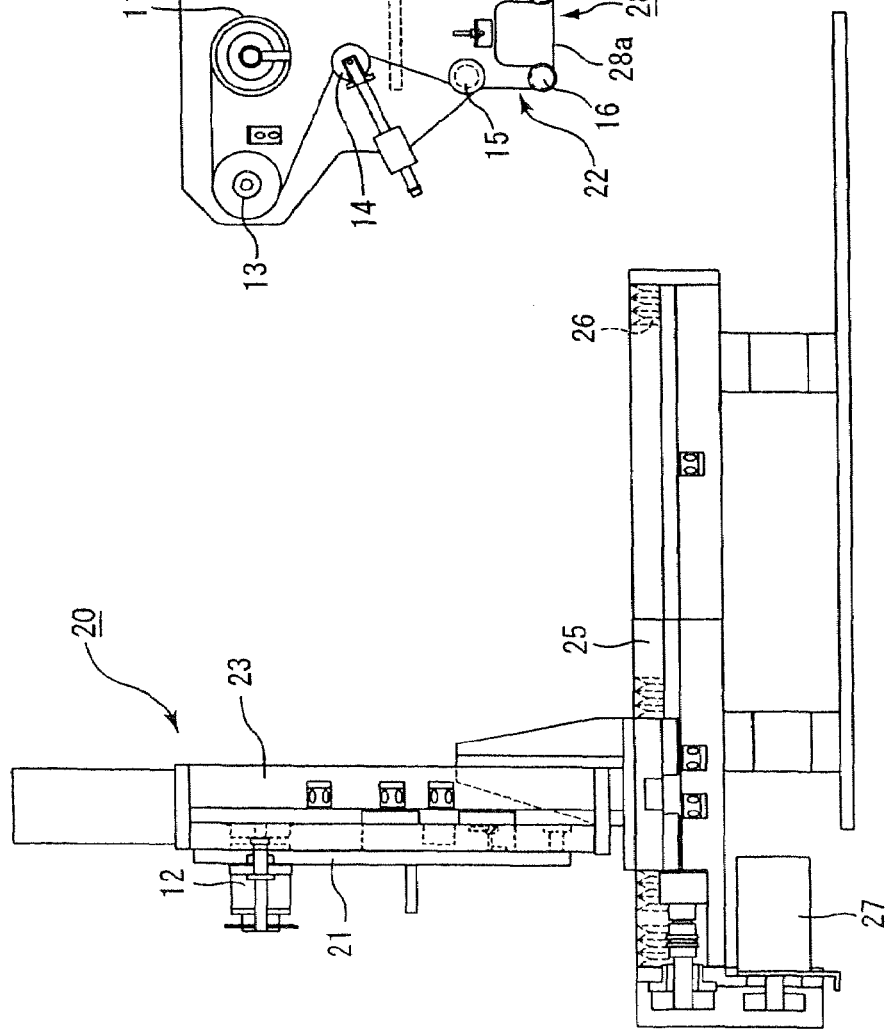
FIG. 1B is a plan view showing an example of an embodiment of a cutting unit constituting the molded body cutting apparatus according to the embodiment of the first aspect of the present invention.

FIG. 1A is a side view showing an example of an embodiment of a cutting unit constituting the molded body cutting apparatus according to one embodiment of the first aspect of the present invention. FIG. 1B is a plan view showing an example of an embodiment of a cutting unit constituting the molded body cutting apparatus according to the embodiment of the first aspect of the present invention. FIGS. 2A, 2B, 2C, 2D, and 2E are side views schematically showing cutting operations of the molded body cutting apparatus according to the embodiment of the first aspect of the present invention.

Figure 2A:
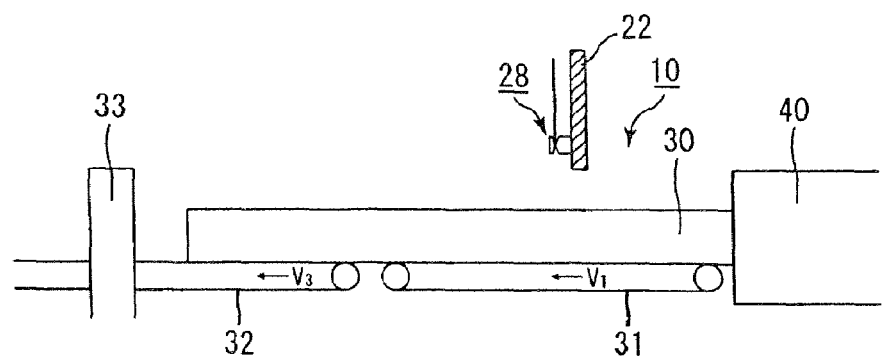
FIGS. 2A, 2B, 2C, 2D, and 2E are side views schematically showing cutting operations of the molded body cutting apparatus according to the embodiment of the first aspect of the present invention.

The molded body cutting apparatus according to the embodiment of the first aspect of the present invention, as shown in FIG. 2A, comprises a first conveyer member 31, a cutting member 28, and a second conveyer member 32. The first conveyer member 31 conveys a continuously extrusion-molded uncut ceramic molded body 30 (Hereinafter termed 'continuous ceramic molded body'). The cutting member 28 moves in the parallel direction to the first conveyer member 31 and also moves in the vertical direction, and cuts the continuous ceramic molded body 30 to a predetermined length by passing through the interior of the continuous ceramic molded body 30. The second conveyer member 32 conveys the ceramic molded body that has been cut by the cutting member 28. Also, a passage sensor 33 (described later) is disposed in the downstream of conveyance direction of the second conveyer member and detects the passage of the cut ceramic molded body.

The state of arrangement of the cutting member 28 shown in FIGS. 2A, 2B, 2C, 2D, and 2E corresponds to enlarged state of a cutting member support portion 22 and the cutting member 28 when viewing a cutting unit 20 shown in FIG. 1B from the right hand side, and a cylinder 23 is omitted.

In order that the first conveyer member 31 and the second conveyer member 32 are able to convey the continuous ceramic molded body 30 extrusion-molded from an extrusion-molding machine 40 in the parallel direction to the direction of extrusion, the first conveyer member 31 and the second conveyer member 32 have top faces that both exist on the same level plane and both have the same conveyance direction. Also, the cutting member 28 is disposed in a manner such that a cut-in portion 28a that cuts into the continuous ceramic molded body 30 is orthogonal to the longitudinal direction of the continuous ceramic molded body 30.

First, description will be given to the cutting unit 20 containing the cutting member 28 while referencing FIGS. 1A and 1B.

The cutting unit 20, as shown in FIG. 1B, is generally comprised of a sender bobbin 11 and a reel-in bobbin 12 on a base 21. The sender bobbin 11 sends out the cutting member 28 and the reel-in bobbin 12 reels in the cutting member 28. The cutting unit 20 also comprises a plurality of pulleys configured to guide the above mentioned cutting member 28 from the sender bobbin 11 through the cutting member support portion 22 to the reel-in bobbin 12. Also, during the cutting of the continuous ceramic molded body 30, the cutting unit 20 is configured to set the cutting member 28 into motion in a manner so as to pass through the interior of the continuous ceramic molded body 30 thereby cutting it in a manner orthogonal to the longitudinal direction of the continuous ceramic molded body 30 while moving synchronized with the first conveyer member 31 conveying the continuous ceramic molded body 30 at a speed almost identical to the extrusion speed of the continuous ceramic molded body 30.

Specifically, along with the sender bobbin 11 for sending out the cutting member 28 and the reel-in bobbin 12 for reeling in the cutting member 28, established on the base 21 of the cutting unit 20 is a large pulley 13 along with six other pulleys 14, 15, 16, 17, 18, and 19 for guiding the cutting member 28 from the sender bobbin 11 through the cutting region and to the reel-in bobbin 12.

The sender bobbin 11 is a cylindrical shape and a large amount of the cutting member 28 is wrapped there around. Each of both ends of the sender bobbin 11 is provided with a brim portion that is orthogonal to the axial direction of the sender bobbin 11, and it becomes easier to maintain a reeled state of the cutting member 28 as well as it becomes easier to send out the large amount of the cutting member 28 in a continuous or intermittent manner. The large pulley 13 is roughly the same shape as the sender bobbin 11 and is attached at the same height. According to this large pulley 13, even in cases in which the amount of the cutting member 28 wrapped around the sender bobbin 11 is small and the cutting member 28 is sent out from a location lower than the top portion of the large pulley 13, the cutting member 28 is naturally guided to the next pulley 14 which is at a lower location with respect to the sender bobbin 11.

The cutting member support portion 22 is provided on the bottom left of the base 21, and the cutting member 28 hangs in between the pulleys 16 and 17 attached to the end portion of this cutting member support portion 22. Also, the cutting member support portion 22 is configured to bestride the extrusion-molded ceramic molded body by lowering the base 21. Moreover, it is easy for the pulley 14 situated diagonally at the bottom right position of the large pulley 13 to move its position, and thereby, it becomes easier to adjust the degree of tension of the cutting member 28.

The base 21, having bobbin and pulleys of this kind, is fixated to a cylinder 23 capable to move upwards and downwards. This cylinder 23 is provided a peak onto a slide platform 25 capable to slide forward and backward (In other words, able to slide in the direction parallel to the direction of conveyance of the ceramic molded body). The cylinder 23 is an air cylinder or an oil cylinder, making it easier for the base 21 to move in the vertical direction by conducting adjustment of the air pressure or oil amount of the cylinder. Also, the slide platform 25 is fitted with screw to a ball screw 26 provided horizontally, and is configured to move forward and backward by the direction of rotation of the ball screw 26. More specifically, the end portion of the ball screw 26 is joined to the end of a motor 27 by a belt (not shown). Thus the ball screw 26 rotates by the rotation of the motor 27. Thus, the slide platform 25, the cylinder 23 fixed to the slide platform 25, and the base 21 move forward and backward in correspondence with the direction of rotation of this ball screw 26.

In this manner, because the base 21 is fixed to the cylinder 23, and the cylinder 23 is fixed to the slide platform 25, it is easier for the base 21 to move both in the forward and backward directions as well as along the vertical direction. Therefore, the base 21 moves in the parallel direction to the movement direction of the first conveyer member 31 that conveys the extruded ceramic molded body and in synchrony with that movement, while lowering the base 21 at a predetermined speed so that the cutting member 28 passes through the interior of the ceramic molded body in a direction perpendicular to the longitudinal direction, herewith cutting of the extruded ceramic molded body to a predetermined length is executed. Therefore, the cut face of that ceramic molded body is formed in a manner orthogonal to the longitudinal direction.

Next, description will be set forth in regard to a series of operation upon cutting a ceramic molded body using the embodiment of the molded body cutting apparatus according to the embodiment of the first aspect of the present invention while referring to FIGS. 2A, 2B, 2C, 2D, and 2E.

In the embodiment of the molded body cutting apparatus, there is a reciprocal relationship of a speed as follows: a conveyance speed of the above mentioned first conveyer member and a movement speed of the above mentioned cutting member in the above mentioned parallel direction are almost the same, before the above mentioned ceramic molded body is cut, and each of the conveyance speed of the above mentioned first conveyer member, the movement speed of the above mentioned cutting member in the above mentioned parallel direction, and a conveyance speed of the above mentioned second conveyer member becomes faster toward the latter, after the above mentioned ceramic molded body is cut.

First, as shown in FIG. 2A the continuous ceramic molded body 30 extrusion-molded from extrusion-molding machine 40 is conveyed by the first conveyer member 31 that has the same conveyance speed $V_1$ as the extrusion-molding speed. At this time, the second conveyer member 32 conveys the continuous ceramic molded body 30 at a conveyance speed $V_3$ that is the same as the conveyance speed $V_1$. Alternately, the cutting member 28 is in a stationary state in its original position before cutting. Needless to say, it becomes easier to control the operation of each the first conveyer member 31 and the second conveyer member 32 independently.

Figure 2B:
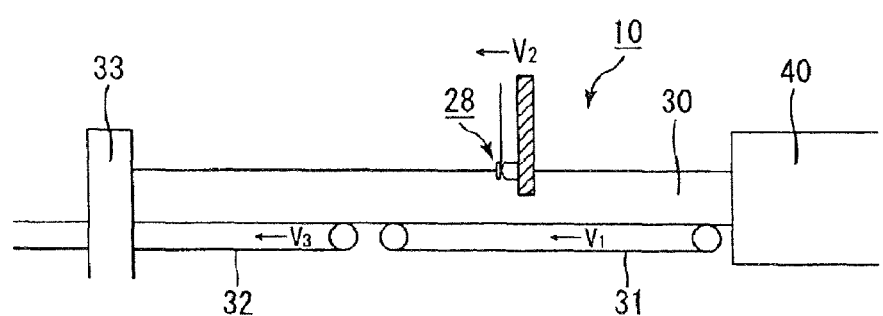

Next, as shown in FIG. 2B, when the front end portion of the continuous ceramic molded body 30 has reached the location of the passage sensor 33, the passage sensor 33 detects the passage of the continuous ceramic molded body 30, and as the passage starts, the passage sensor 33 transmits a 'passage start signal' to a cutting control device (not shown) that controls the operation of the cutting member 28. When this passage start signal is received by the cutting control device, the operation of the cutting member 28 is started. When the operation of the cutting member 28 is started, the cutting member 28 moves in the parallel direction to the movement direction of the first conveyer member 31 and also moves in the vertical downward direction to start cutting of the continuous ceramic molded body 30. At this time, the conveyance speed $V_1$ of the first conveyer member 31, and the movement speed $V_2$ of the cutting member 28 in the above mentioned parallel direction are in an almost the same relationship. Therefore, the cutting member 28 moves along the vertical direction, while in synchrony with the movement of the continuous ceramic molded body 30, and cuts the continuous ceramic molded body 30 in a manner orthogonal to the longitudinal direction of the continuous ceramic molded body 30. And the cutting member support portion 22 lowers in a manner so as to bestride without making contact with the continuous ceramic molded body 30, and the cutting member 28 suspended from the cutting member support portion 22 cuts the continuous ceramic molded body 30.

Figure 2C:
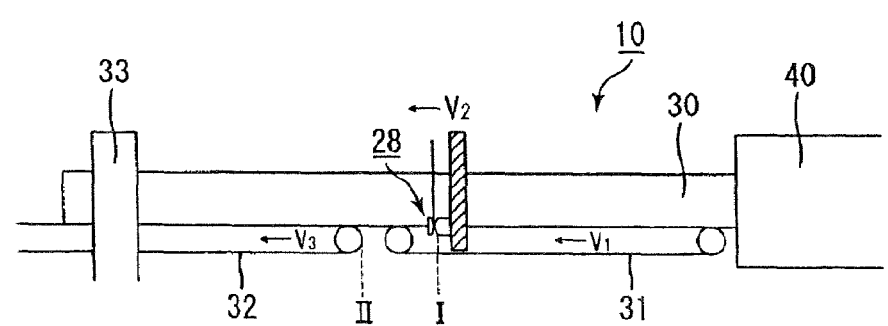
Figure 2D:
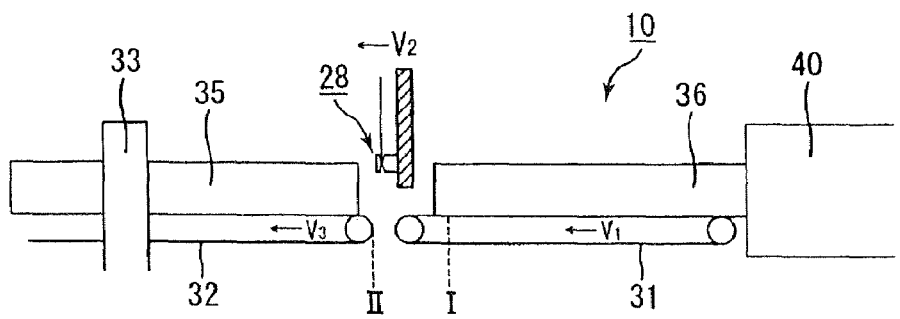

In a molded body cutting apparatus 10, because as the continuous ceramic molded body 30 passes the passage sensor 33 and the passage start signal is received by the cutting control device to start the operation of the cutting member 28, the distance spanning in between the passage sensor 33 and the cutting member 28 at the point where the cutting control device receives the passage start signal becomes the desired length (Herein after, simply termed 'cut length' This cut length corresponds to the length of the ceramic molded body in the longitudinal direction as shown in FIG. 2D described hereinafter) of the post-cut continuous ceramic molded body 30. Therefore, it becomes easier to change the cut length of the continuous ceramic molded body 30 to an arbitrary length by changing the disposal location of the passage sensor 33. For example, it becomes easier to further shorten the cut length of the continuous ceramic molded body 30 by setting the disposal location of the passage sensor 33 not to that location shown in FIG. 2B but to a location even closer to the extrusion-molding machine 40.

In this manner, regarding that it becomes easier to change the cut length of the continuous ceramic molded body 30 to an arbitrary length by changing the disposal location of the passage sensor 33, it is clear from that because the conveyance speed $V_1$ of the first conveyer member and the movement speed $V_2$ Of the cutting member 28 in the parallel direction are almost the same, until the cutting of the continuous ceramic molded body 30 is completed, the cut length of the continuous ceramic molded body 30 is dependant only upon the period of time for passing the space in between the passage sensor 33 and the cutting member 28, and that the cut length of the continuous ceramic molded body 30 is not dependent upon each of the conveyance and movement speeds. This is also one aspect of the present invention.

Again, at this time, the conveyance speed $V_1$ of the first conveyer member 31, the movement speed $V_2$ Of the cutting member 28 in the parallel direction, and the conveyance speed $V_3$ of the second conveyer member satisfy a relationship of $V_1=V_2=V_3$.

Next, the cutting member 28 moves along the vertical direction at a predetermined speed to the point shown in FIG. 2C while passing through the interior of the continuous ceramic molded body 30, thereby cutting the continuous ceramic molded body 30. Afterward, the cutting member 28 rises and returns back to its original position in order to execute the next cut. At this point, in the molded body cutting apparatus according to the embodiment of the first aspect of the present invention, the cutting member 28 does not simply rise after cutting, the first conveyer member 31, the cutting member 28, and the second conveyer member 32 rise while holding a predetermined speed relationship. Because of this, it becomes easier to prevent deformations, cracking, and the like of the cells of the ceramic molded body while it becomes easier to prevent constitution material that has adhered to the cutting member from re-adhering to the cut face and clogging the cells. Herein below, detailed description of the operation of each constituent member of the molded body cutting apparatus 10 after the continuous ceramic molded body is cut will be set forth with the position of the cutting member 28 immediately after cutting of the continuous ceramic molded body 30 defined as 'I', and the position of the end of the second conveyer member 32 facing the first conveyer member 31 defined as 'II'.

In the molded body cutting apparatus 10, after the continuous ceramic molded body 30 is cut, the conveyance speed $V_1$ of the first conveyer member 31, the movement speed $V_2$ of the cutting member 28 in the parallel direction, and the conveyance speed $V_3$ of the second conveyer member 32 becomes faster toward the latter. More specifically, after the continuous ceramic molded body 30 has been cut, the speed of each member has a relationship of $V_1<V_2<V_3$.

At the point in time which the cutting of the continuous ceramic molded body 30 by the cutting member 28 has been completed, the cutting unit 20 detects (i.e. Detection by confirming movement over a predetermined distance in the vertical downward direction) the completion of cutting, sets the movement speed of the cutting member 28 in the parallel direction to the $V_2$ that satisfies the above mentioned relationship, while starting the movement of the cutting member 28 in the vertical upward direction, and further, transmits a 'cutting completion signal' to a conveyance control device (not shown) configured to control the conveying operation of the second conveyer member 32. When the conveyance control device receives this cutting completion signal, the conveyance speed $V_3$ of the second conveyer member 32 is changed so as to satisfy the above mentioned speed relationship.

After the continuous ceramic molded body 30 is cut, each of the first conveyer member 31, the cutting member 28, and the second conveyer member 32 has a speed relationship in the manner mentioned above. According to this speed relationship, after the passage of a predetermined amount of time $t_1$ from the completion of cutting, as shown in FIG. 2D, each of the rear end portion of a cut ceramic molded body 35, the cutting member 28, and the front end portion of a continuous ceramic molded body 36 to be newly cut exists at a position separated by a predetermined distance in correspondence with the speed of each from the position I in the direction of extrusion-molding. Specifically stated, the rear end portion of the ceramic molded body 35 is in the position most distanced from the position I, the front end portion of the ceramic molded body 36 is in the position closest from the position I, and the cutting member 28 is positioned in between the rear end portion of the ceramic molded body 35 and the front end portion of the continuous ceramic molded body 36.

According to the molded body cutting apparatus 10, as each of the conveyance speed $V_1$ of the first conveyer member 31, the movement speed $V_2$ of the cutting member 28 in the parallel direction, and the conveyance speed $V_3$ of the second conveyer member 32 has the speed relationship in the manner mentioned above, each of the rear end portion of the ceramic molded body 35, the cutting member 28, and the front end portion of the ceramic molded body 36 newly continuously extrusion-molded comes to have the relationship of positioning mentioned above, after the continuous ceramic molded body 30 is cut.

Figure 2E:
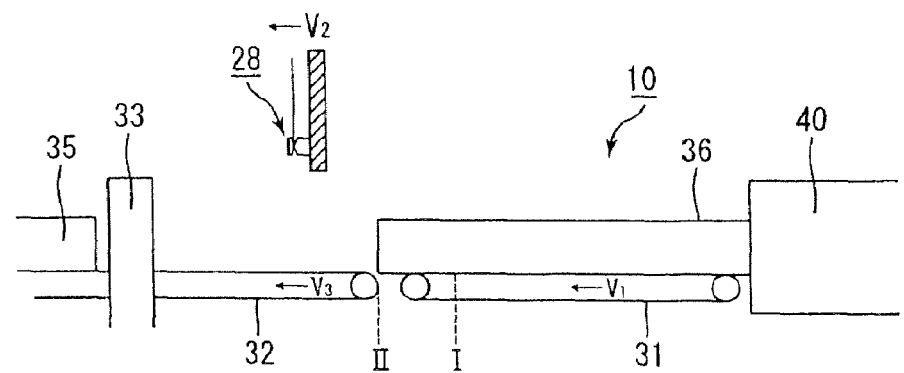

Next, while satisfying the above mentioned speed relationship, each of the first conveyer member 31, the cutting member 28, and the second conveyer member 32 comes into action, and each of the ceramic molded body 35, the cutting member 28, and the continuous ceramic molded body 36 comes to have the relationship of positioning as shown in FIG. 2E after the passage of a predetermined amount of time $t_2$ from the completion of cutting. Specifically stated, concerning the ceramic molded body 35 conveyed by the second conveyer member 32 which has the greatest rate of speed, the rear end portion thereof exits from the passage sensor 33. Also, in the continuous ceramic molded body 36 conveyed by the first conveyer member 31 which has the smallest rate of speed, the front end portion thereof has been conveyed to the position at the end (Position II in the drawings) of the second conveyer member 32. Concerning the cutting member 28, the position of the parallel direction to the conveyance direction exists in between the rear end portion of the ceramic molded body 35 and the front end portion of the continuous ceramic molded body 36, and at a raised position along the vertical direction at the same height as its original position.

At the point where the passage sensor 33 ceases to detect the presence of the ceramic molded body 35, in other words, at the point where the rear end portion of the ceramic molded body 35 exits from the passage sensor 33, the passage sensor 33 transmits a 'passage complete signal' to the conveyance control device that controls the operation of the second conveyer member 32. When the conveyance control device receives this passage complete signal, the conveyance control device changes the conveyance speed $V_3$ of the second conveyer member 32 and sets it to the same speed as the conveyance speed $V_1$ of the first conveyer member 31. By doing this, the ceramic molded body 36 to be newly cut is conveyed by the first conveyer member 31 to pass the position II. Even if the continuous ceramic molded body 36 is conveyed onto the second conveyer member 32, since the conveyance speed of the first conveyer member 31 and the conveyance speed of the second conveyer member 32 are the same speed, it becomes easier for the next cutting procedure to proceed smoothly with no occurrence of tensile stress, compressive stress, or the like to the continuous ceramic molded body 36.

As mentioned above, although it is preferable for the conveyance speed $V_3$ of the second conveyer member 32 before cutting to be the same as the conveyance speed $V_1$ of the first conveyer member 31, as long as deformations that may lower the product quality of the continuous ceramic molded body 30 and the continuous ceramic molded body 36 do not occur, it is acceptable for the conveyance speed $V_3$ of the second conveyer member 32 to be greater than the conveyance speed $V_1$ of the first conveyer member 31 over both before cutting and after cutting.

Regarding the cutting member 28, after the passage of the period of time $t_2$ from the completion of cutting, as shown in FIG. 2E, the cutting member 28 is raised to the same height as its original position (refer to FIG. 2A), and afterward, moves to the original position to wait for the next cutting procedure. In the period of movement from the position shown in this FIG. 2E to the original position, the sender bobbin 11 and the reel-in bobbin 12 come into action to move the cutting member 28 used in the previous cutting in a manner sending just a predetermined length of the cutting member 28, and replace the used cutting member 28 with new cutting member. And when the front end portion of the ceramic molded body to be newly cut reaches the passage sensor, the new cutting member starts to move in the vertical downward direction to execute cutting of the ceramic molded body. It is acceptable for the replacement of the cutting member 28 executed by the sender bobbin 11 and the reel-in bobbin 12 to be executed during the waiting for the next cutting procedure.

By repeating the above procedure, it becomes easier to continuously cut a ceramic molded body extrusion-molded from an extrusion-molding machine.

It is preferable that the above mentioned cutting member be a filamentous body.

The cutting member 28 used in the cutting of the above mentioned ceramic molded body is not particularly limited. For instance, examples of the cutting member 28 include cutters having a blade formed at the cutting portion, lasers, filamentous bodies, and the like. However, in consideration of matters such as the area of contact with the ceramic molded body, running cost, and the like, a filamentous body is desirable form for use as the cutting member. Using a filamentous body as the cutting member is desirable, because in cases using a filamentous body, the area of contact with the ceramic molded body is extremely small so there is no occurrence of cracking, deformation such as rubbed deformation, chip or the like even if the filamentous body contacts with the cell of the ceramic molded body, and no accompanying equipment is needed as in the case of using a laser, which makes it easier to hold the running costs down.

In a case in which the cutting member is a filamentous body, the diameter of the filamentous body is not particularly limited, however a diameter of at least about 0.05 mm and at most about 0.5 mm is desirable.

If the diameter of the filamentous body is about 0.05 mm or more, it becomes difficult for the degree of strength to deteriorate thereby making it difficult for durability to be lowered. Alternately, if the diameter of the filamentous body is about 0.5 mm or less, it becomes difficult for the contact area with the ceramic molded body to become larger, thereby making it difficult for deformation and the like of the cut face to occur.

Moreover, it is preferable that the above mentioned filamentous body be a metallic filament whose periphery is coated with a resin.

The cutting member 28 is not particularly limited, as both metallic filaments and resin filaments are acceptable. However, in light of durability, a metallic filament is desirable while in light of resistance to adherence, a resin filament is desirable. Therefore in light of these points, it is desirable for the cutting member to be a metallic filament such as the SUS whose periphery is coated with resin. Although not particularly limited, examples of the resin to be coated the metallic filament include resins of nylon, polyester, polyvinyl alcohol, polyacryl and the like.

In the above mentioned molded body cutting apparatus 10, a slender (fine) cutting member 28 that a periphery of a metallic filament is coated with a resin is used. This cutting member 28 cuts the above mentioned ceramic molded body to a predetermined length through the interior of the ceramic molded body while moving in synchrony with the extrusion speed of the ceramic molded body. Thus, as the contact area of the cutting member 28 with the above mentioned ceramic molded body during cutting is easier to be extremely small, it becomes easier to execute favorable cutting of a molded body without any influence on the shape of the molded body itself, the shape of the cells, and the like.

Also, it is preferable that the molded body cutting apparatus according to the embodiment of the first aspect of the present invention be configured to move the above mentioned filamentous body, each time the ceramic molded body is cut.

In the cutting unit 20 including the cutting member 28, in a case in which the cutting member 28 is a filamentous body, a new length of filamentous body is sent out each single execution of cutting. Since the cutting of the next continuous ceramic molded body 30 is carried out using a new filamentous body, it becomes easier to prevent breaking and the like of the filamentous body. In addition, by the action of moving the filamentous body, it becomes easier to prevent an occurrence of wrong cuttings, defective cuttings, off-specification products or the like, arising from adhering of the constitution material of the ceramic molded body to the cutting member 28, it becomes easier to prevent the constitution material of the ceramic molded body that has adhered to the cutting member during the previous cutting procedure from re-adhering to the ceramic molded body upon the new cutting, and it becomes thus easier to execute a favorable cutting. After all of the cutting member 28 has been reeled in by the reel-in bobbin 12, it becomes easier to reuse the cutting member 28 by wiping off the constitution material of the ceramic molded body that has adhered to the cutting member 28. It is also acceptable to wipe the cutting member 28 immediately after cutting.

It is preferable that the molded body cutting apparatus according to the embodiment of the first aspect of the present invention comprises a ball screw that moves the above mentioned cutting member in the above mentioned parallel direction, and a cylinder that moves the above mentioned cutting member in the vertical direction.

It is preferable to use the above mentioned ball screw as the mechanism for moving the above mentioned cutting member in the parallel direction to the movement direction of the above mentioned first conveyer member. However the above mentioned mechanism is not limited to the ball screw, as examples of other mechanisms preferably used include drive mechanisms such as conveyer mechanisms, linear guides, cross roller guides, translation actuators, and rotation actuators. Also, although it is preferable that the above mentioned cylinder be used as the mechanism for moving the above mentioned cutting member in the vertical direction, the above mentioned mechanism is not limited to the cylinder, as it is acceptable to use mechanisms such as a ball screw in the same mode as in the mechanism used to move the above mentioned cutting member in the parallel direction for instance.

The constitution material of the contact portion of the first conveyer member and the second conveyer member that make contact with the ceramic molded body is not particularly limited, however acceptable examples of the constitution material include resins such as natural rubber, nylon, urethane, and polyester. Also, it is acceptable that the above mentioned contact portion formed of these constitution materials has a shape that is sponge-like, intertwined continuous fibers or the like, and is capable of elastic deformation in cases in which a predetermined amount of stress has been applied thereon. If the contact portion has such a shape, when the cutting member passes down through the interior of the ceramic molded body and reaches the bottom face of the ceramic molded body, it becomes easier for the cutting member to sink down into the contact member, thereby making it easier to execute complete cutting of the ceramic molded body.

Although cutting of the continuous ceramic molded body 30 is complete (see FIG. 2C) at the point where the cutting member 28 has reached the position I, the rear end portion of the ceramic molded body 35 at this point is on the first conveyer member 31, and afterward, the ceramic molded body 35 is conveyed in correspondence to the conveyance speed of the second conveyer member 32 which is faster than the conveyance speed of the first conveyer member 31. Accordingly, in between the Position I and the end portion of the first conveyer member 31, a friction is generated between the rear end portion of the ceramic molded body 35 and the first conveyer member 31. However, because the contact portion of the first conveyer member 31 with the continuous ceramic molded body 30 comprising the constitution material as described above and has a smooth face, it is assumed that the friction is as small as it can be ignored, and there is no influence to the surface of the ceramic molded body.

And although description has been set forth about the object to be cut of the continuous ceramic molded body that has been continuously extrusion-molded as the object of cutting by the molded body cutting apparatus according to the embodiment of the first aspect of the present invention, as long as the object to be cut is a ceramic molded body, the object to be cut is not limited to being continuous molded, may be an arbitrary ceramic molded body having other shape.

Next, description will be set forth regarding the method for cutting a ceramic molded body according to the embodiment of the second aspect of the present invention.

Because the above described molded body cutting apparatus according to the embodiment of the first aspect of the present invention can be used optimally preferably as the molded body cutting apparatus employed for use in the method for cutting a ceramic molded body according to the embodiment of the second aspect of the present invention, details of the constitution will be omitted from description here, there will be described with a focus on the conditions and the like during the cutting procedure.

It is preferable that the lowering speed of the cutting member during cutting is at least about 0.6 m/min and at most about 30 m/min.

At a lowering speed of about 0.6 m/min or more, it becomes difficult for the ceramic molded body to undergo deformation due to the stress during cutting, and it becomes difficult for the cutting efficiency to drop. Alternately, if the lowering speed of the cutting member during cutting is about 30 m/min or less, as it becomes difficult for the cutting procedure to become faster and it becomes difficult for the load on the cutting unit including the cutting member to be great, it becomes difficult to progress degradation and ablation of the equipment early.

In a case that the cutting member is a filamentous body, it is preferable that the degree of tension of the filamentous body is at least about 2N and at most about 8N.

At a tension of about 2N or more, it becomes difficult for deflection to occur in the filamentous body during cutting, which will make it easier to achieve a good cutting. Alternately, if the tension of the filamentous body is about 8N or less, it becomes difficult for the tension to exceed the tensile strength of the filamentous body and it becomes difficult to deteriorate in durability, and it becomes difficult for an excessive load to be put on the sender bobbin that sends out the filamentous body cutting member, the pulleys and the like, which makes it difficult for damage to occur.

In the method for cutting a ceramic molded body according to the embodiment of the second aspect of the present invention, a relationship of $V_1<V_2<V_3$ comes into effect as the relationship between the conveyance speed $V_1$ of the first conveyer member (Hereinafter simply termed '$V_1$'), the movement speed $V_2$ (Hereinafter simply termed '$V_2$') of the cutting member in the parallel direction, and the conveyance speed $V_3$ (Hereinafter simply termed '$V_3$') of the second conveyer member, after the ceramic molded body is cut. Here, description will be given in regard to examples of variations of the operation order of each member while referencing FIGS. 2C, 2D, and 2E.

First, as shown in FIG. 2C, the state of the ceramic molded body at the completion of cutting is taken as the state at a time period t=0, then the state of the kind shown in FIG. 2D for instance after the passage of the predetermined period of time $t_1$ is taken as the state at a time period $t=t_1$ (Hereinafter termed simply '$t_1$'), and moreover the state of the kind shown in FIG. 2E for instance after the passage of the predetermined period of time $t_2$ after the completion of cutting is taken as the state at a time period $t=t_2$ (Hereinafter termed simply '$t_2$')

Here, in the description of the molded body cutting apparatus according to the embodiment of the first aspect of the present invention, it has been described that at the state $t=t_2$ of FIG. 2D, at the same time as the completion of cutting the cutting member 28 moves in the parallel direction at the movement speed $V_2$ of the kind satisfying the above mentioned relationship, and moves also in the vertical direction.

However, the speed relationship of each of the members, and the movement timing and the like is not limited to the above mentioned order, as it is also acceptable to have the relationship $V_1=V_2=V_3$ at t=0, change just the conveyance speed of the second conveyer member 32 to $V_1=V_2<V_3$ without moving the cutting member 28 in the vertical direction at $0<t<t_1$, and change the movement speed $V_2$ in the parallel direction to $V_1<V_2<V_3$ while moving the cutting member 28 in the vertical upward direction at $t_1 \leq t-t_2$.

First, in a case like this, at $0<t<t_1$, only the rear end portion of the ceramic molded body 35 moves in a manner separating from the front end portion of the continuous ceramic molded body 36 and the cutting member 28. Therefore, the cutting member 28 remains positioned at the bottom end of the front end portion of the continuous ceramic molded body 36. Afterward, $V_2$ is changed at $t_1 \leq t \leq t_2$ in a manner satisfying the relationship of $V_1<V_2<V_3$, and because of this, the cutting member 28 moves in the parallel direction and the vertical direction in a manner separating from the front end portion of the continuous ceramic molded body 36, and at the time $t_2$ takes the state shown in FIG. 2E.

Also, besides the above mentioned example, it is acceptable at t=0 for the relationship to be $V_1=V_2=V_3$, at $0<t<t_1$, for the relationship to be set to $V_1<V_2<V_3$ while moving the cutting member 28 in the vertical upward direction, and at $t_1 \leq t \leq t_2$, for the relationship to be set to $V_1=V_2<V_3$ while moving the cutting member 28 in the vertical upward direction.

In any of the cases, it becomes easier for the cutting member 28 to rise to the same height as the original position without the contact of the cutting member 28 with the ceramic molded body 35 or the continuous ceramic molded body 36, and it becomes easier to carry out a series of cutting procedure efficiently and with no occurrence of defects.

Herein above, although several examples of variations of the operation order of each member after cutting have been set forth, the present invention is not to be limited to these modes.

Here, as long as the relationship $V_1<V_2<V_3$ is satisfied, the speed ratio among the conveyance speed $V_1$ of the first conveyer member 31, the movement speed $V_2$ Of the cutting member 28 in the parallel direction, and the conveyance speed $V_3$ of the second conveyer member 32 is not particularly limited. However, it is preferable if the speed $V_1$ is the reference, that $(V_2/V_1)$=at least about 3 and at most about 7, and that $(V_3/V_1)$=at least about 5 and at most about 10.

By setting $V_1$, $V_2$, and $V_3$, to the above mentioned speed ratio, it becomes easier for the cutting member 28 to rise to the same height as the original position after cutting without making contact with the cut ceramic molded body 35 or the continuous ceramic molded body 36 to be newly cut, and without putting an excessive load on each of the members that constitute the molded body cutting apparatus.

As for the conveyance speed $V_3$ of the second conveyer member 32, it is only necessary to satisfy the above mentioned relationship $(V_1<V_2<V_3)$ during the period of time $t_2$ from the completion of cutting. This is because, as in the manner set forth above, the period of time is equivalent to $t_2$ until the cut ceramic molded body 35 passes and exits from the passage sensor 33, and after that, the front end portion of the continuous ceramic molded body 36 to be newly cut passes the position II to thereby ride onto the second conveyer member 32. Therefore, it is possible to employ the value $(L/t_2)$, which is the length of this ceramic molded body 35 in the longitudinal direction divided by the time $t_2$, as the setting value of $V_3$. Also, it is acceptable to increase or decrease the value of $V_3$ based on the setting value $(L/t_2)$, according to convenience. For example, if the setting is one of such a manner so that the portion of half of the full length of the ceramic molded body 35 passes the passage sensor 33, it would be acceptable to reduce the $V_3$ to half. Concretely stated, the value $V_3$ in this case is attained by dividing $(L/t_2)$ by 2.

According to the automatic cutting apparatus mentioned in JP-A S61-241094, it was possible to conduct cutting of a molded body in a manner in which the cut face was vertical while automating the conveyance and cutting of an extrusion-molded body. However, because this automatic cutting apparatus simply rose back to its original position after cutting an extrusion-molded body to proceed to the next cutting, there has been the concern that the cutting piece and the cut molded body might make contact when the cutting piece rose, thereby making deformation, cracking, or the like to occur on the molded body. Also, there has been the concern that the constitution material of the molded body that has adhered to the cutting piece during cutting might come to adhere to the cut face of the molded body when the cutting piece was pulled up. In the molded body cutting apparatus according to the embodiment of the first aspect of the present invention, it becomes difficult for the above mentioned problem to occur. In particular, even if the object to be cut is a honeycomb molded body having cells partitioned by extremely thin cell walls, it becomes difficult for the deformation or cracking of the cell walls by contact of the molded body and the cutting piece when the cutting piece rises to occur, and it becomes difficult for the defect such as being clogged by the adhering of constitution material to occur.

Next, description will be set forth in regard to the method for manufacturing a honeycomb structured body according to the embodiment of the third aspect of the present invention.

Figure 3:
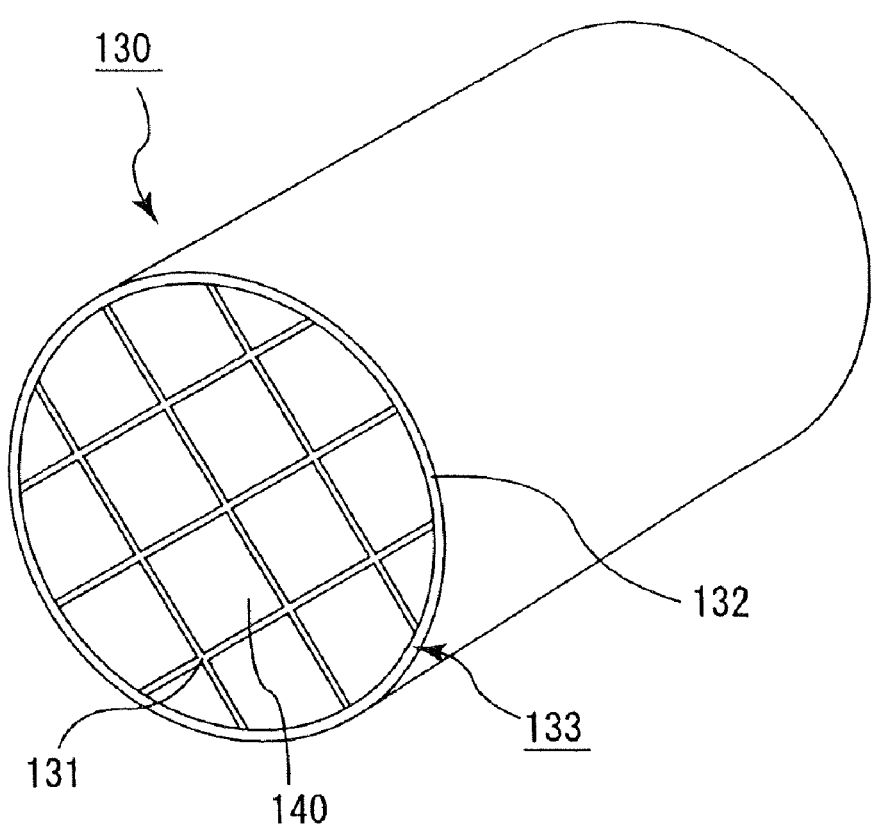
FIG. 3 is a perspective view schematically showing an example of a honeycomb structured body according to one embodiment of the third aspect of the present invention.
Figure 4A:
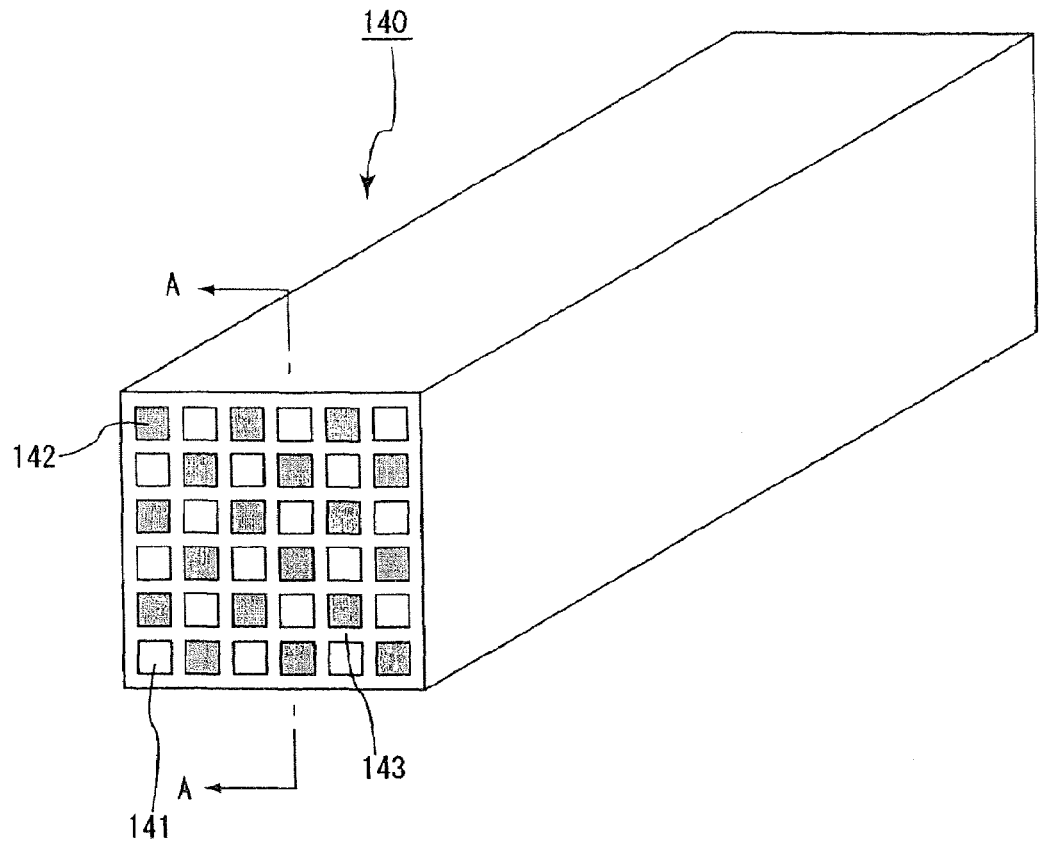
FIG. 4A is a perspective view schematically showing the honeycomb fired body constituting the honeycomb structured body according to the embodiment of the third aspect of the present invention.

FIG. 3 is a perspective view schematically showing an example of a honeycomb structured body according to one embodiment the third aspect of the prevent invention. FIG. 4A is a perspective view schematically showing the honeycomb fired body constituting the honeycomb structured body according to the embodiment the third aspect of the prevent invention, while FIG. 4B is a cross-sectional view taken along the line A-A thereof.

In a honeycomb structured body 130, a plurality of honeycomb fired bodies 140 as shown in FIG. 4A, are bound together by interposing a sealing material layer (an adhesive layer) 131 to form a ceramic block 133, and a sealing material layer (a coat layer) 132 is further formed over the outer periphery of the ceramic block 133.

And the honeycomb fired body 140, as shown in FIG. 4A, has a multitude of cells 141 placed in parallel to each other in the longitudinal direction, and cell walls 143, which partition the cells 141 individually, functions as a filter.

Figure 4B:
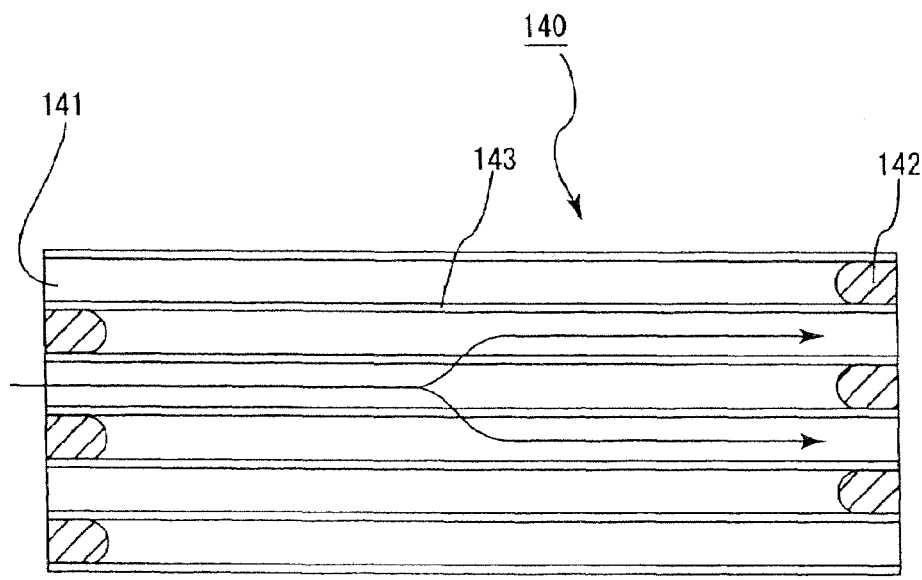
FIG. 4B is a cross-sectional view taken along the line A-A of FIG. 4A.

More specifically, as shown in FIG. 4B, the end portion of either the exhaust gas inlet side or the exhaust gas outlet side of the cells 141 formed in the honeycomb fired body 140 is sealed by a plug material layer 142. Therefore, exhaust gas entering one cell 141 will always pass through the cell wall 143 separating the cells 141 and thus flow out through another one of the cells 141. When the exhaust gas passes through the cell wall 143, particulates contained within the exhaust gas are captured by the cell wall 143, thereby purifying the exhaust gas.

Herein below, the order of the operation of the method for manufacturing a honeycomb structured body according to the embodiment of the third aspect of the present invention will be described.

Here, description will be set forth in regard to a method for manufacturing a honeycomb structured body in a case wherein silicon carbide powder which is a ceramic raw material is used, as an example of a case in which a honeycomb structured body composed chiefly of silicon carbide is manufactured.

It is a matter of course that the chief component of the honeycomb structured body is not limited to silicon carbide. Nitride ceramics such as aluminum nitride, silicon nitride, boron nitride, titanium nitride, carbide ceramics such as zirconium carbide, titanium carbide, tantalum carbide, tungsten carbide, oxide ceramics such as, alumina, zirconia, cordierite, mullite, aluminum titanate and the like, are suitable for use as other ceramic raw material.

Of the above raw materials put forth as raw materials, nonoxide ceramics are desirable for use, silicon carbide, in particular, is desirable. This is because of silicon carbide in particular excels in thermal resistance, mechanical strength, and thermal conductivity. Further, ceramic raw materials such as silicon containing ceramics that metallic silicon is compound with the above mentioned ceramic components, ceramics bound by silicon or silicate compounds and the like, are also suitable for the constitution material, and out of them, a silicon carbide blended with metallic silicon (silicon containing silicon carbide) is preferable.

First, organic binder is dry mixed with an inorganic powder such as silicon carbide powder and the like having a different mean particle diameter as the ceramic raw material to prepare the powder mixture. A liquid mixture is prepared by blending liquid plasticizer, lubricating agent, and water. Next, the above mentioned powder mixture and the above mentioned liquid mixture are further mixed together using a wet mixing machine, and thus a wet mixture for manufacturing the molded body is prepared.

Now although the particle diameter of the above mentioned silicon carbide powder is not particularly limited, a particle diameter having little shrinkage during the subsequent firing is preferable. For example, a combination of 100 parts by weight of a powder having a mean particle diameter of at least about 0.3 μm and at most about 50 μm and at least about 5 parts by weight and at most about 65 parts by weight of a powder having a mean particle diameter of at least about 0.1 μm and at most about 1.0 μm, is desirable.

Although in order to adjust the pore diameter of the honeycomb fired body, it is necessary to adjust the temperature of firing, it becomes easier for the pore diameter to be adjusted by adjusting the particle diameter of the inorganic powder.

The above mentioned organic binder is not limited in particular, and binders such as methyl cellulose, carboxymethyl cellulose, hydroxyethyl cellulose, polyethylene glycol and the like, for example, are acceptable for use. Of the binders mentioned above, methyl cellulose is preferable.

It is preferable that the blending amount of the above mentioned binder be at least about 1 part by weight and at most about 10 parts by weight of binder per 100 parts by weight of inorganic powder.

The above mentioned plasticizer is not limited in particular, and glycerin and the like, for example, is acceptable for use.

The above mentioned lubricating agent is not limited in particular, and polyoxyalkylene series compounds such as polyoxyethylene alkyl ether, and polyoxypropylene alkyl ether and the like, for example, are acceptable for use.

Some concrete examples of lubricating agents include polyoxyethylene monobutyl ether, polyoxypropylene monobutyl ether and the like.

Also, in some cases, it is unnecessary to use plasticizer or lubricating agent in the mixed raw material powder.

Also, when preparing the above mentioned wet mixture, it is acceptable to use a dispersion medium, examples of the dispersion medium include water, organic solvents such as benzene, and alcohol such as methanol, and the like.

Further, it is also acceptable to add a mold auxiliary agent to the above mentioned wet mixture.

The mold auxiliary agent is not limited in particular, and for example, ethylene glycol, dextrin, fatty acids, fatty acid soap, polyalcohol and the like, may be used.

Further, it is acceptable, according to need, to add a pore-forming agent such as balloon, which is a micro sized hollow sphere having oxidant series ceramic as a component, spherical acrylic particle, graphite or the like, to the above mentioned wet mixture.

The above mentioned balloon is not particularly limited, alumina balloons, glass micro balloons, shirasu balloons, fly ash balloons (FA balloons), mullite balloons and the like, for example, are all acceptable for use. Of the above mentioned, alumina balloon is preferable for use.

Also, it is preferable for the temperature of the above prepared wet mixture, which uses silicon carbide, to be about 28 Degrees Celsius or less. This is because if the temperature is about 28 Degrees Celsius or less, it becomes difficult for organic binder to be gelated.

It is also preferable for the ratio of the organic material within the above mentioned wet mixture to be about 10% by weight or less, and it is also preferable for the moisture content of the same wet mixture to be at least about 8.0% by weight and at most about 20.0% by weight.

After preparation, the above mentioned wet mixture is conveyed and put into a molding machine.

After the above mentioned wet mixture has been put into an extrusion-molding machine, it is formed into a honeycomb molded body of a predetermined shape by extrusion-molding. This honeycomb molded body is cut to a predetermined length by a molded body cutting apparatus.

The embodiment of the above mentioned molded body cutting apparatus used in the method for manufacturing a honeycomb structured body according to the embodiment of the third aspect of the present invention comprises:

a first conveyer member that conveys the extrusion-molded uncut pillar-shaped honeycomb molded body;

a cutting member that moves in a direction parallel to a movement direction of the above mentioned first conveyer member while moving also in a vertical direction, and cuts the above mentioned honeycomb molded body to a predetermined length by passing through the interior of the above mentioned honeycomb molded body; and a second conveyer member that conveys a honeycomb molded body cut to a predetermined length by the above mentioned cutting member, a conveyance speed of the above mentioned first conveyer member and a movement speed of the above mentioned cutting member in the above mentioned parallel direction being almost the same, before the above mentioned honeycomb molded body is cut, and each of the conveyance speed of the above mentioned first conveyer member, the movement speed of the above mentioned cutting member in the above mentioned parallel direction, and a conveyance speed of the above mentioned second conveyer member becoming faster toward the latter, after the above mentioned honeycomb molded body is cut.

It is possible to optimally use the molded body cutting apparatus according to the embodiment of the first aspect of the present invention as the embodiment of the molded body cutting apparatus of this kind. It is also possible to optimally employ the method for cutting a honeycomb molded body according to the embodiment of the second aspect of the present invention as a method for cutting a ceramic molded body using the embodiment of this molded body cutting apparatus. Thus the details of these constitutions as well as the operation and effects are omitted at this point.

In the method for manufacturing a honeycomb structured body according to the embodiment of the third aspect of the present invention, it is preferable if the above mentioned cutting member is a filamentous body.

If the cutting member is a filamentous body, it becomes difficult for excessive stress to be generated since the area of contact during cutting is extremely small. Because of this, even the object to be cut having plastically deformable characteristics such as the above mentioned honeycomb molded body becomes easier to be cut favorably.

Also, in a case in which the cutting member is a filamentous body, it is preferable that the filamentous body is a metallic filament whose periphery is coated with a resin.

In some cases, mold auxiliary agents, organic components, and the like may be contained within the constitution material of the honeycomb molded body for the purpose of giving the honeycomb molded body better moldability. If such additives are contained in the constitution material, it becomes easier for the honeycomb molded body itself to have adhesive characteristics, which may promote the adherence of that constitution material to the cutting member upon cutting. However, if the filamentous body is a metallic filament whose periphery is coated with a resin, it becomes easier for the adherence of the above mentioned constitution material can be restrained to a minimum, and since the filamentous body is a metallic filament it becomes easier to improve on durability as well.

Also, it is preferable that the molded body cutting apparatus used in the method for manufacturing a honeycomb structured body according to the embodiment of the third aspect of the present invention is configured to move the above mentioned filamentous body each time the honeycomb molded body is cut.

With this kind of configuration, it becomes easier to prevent an occurrence of wrong cuttings, defective cuttings, off-specification products or the like due to constitution material that has adhered during a prior cutting from occurring during new cutting operations, and it is also possible to prevent the re-adherence and the like of the constitution material to the cut face.

Moreover, it is preferable that the above mentioned molded body cutting apparatus comprise a ball screw that moves the above mentioned cutting member in the above mentioned parallel direction, and a cylinder that moves the above mentioned cutting member in the vertical direction.

This is because, by doing so, it becomes easier to execute a cutting of honeycomb molded body smoothly, and it is suited to the promotion of full automation.

By configuring as above, it becomes easier, in the method for manufacturing a honeycomb structured body according to the embodiment of the third aspect of the present invention, to cut a honeycomb molded body that has been extrusion-molded from an extrusion-molding machine, perpendicularly to the longitudinal direction to a predetermined length without the occurrence of adhering matter to the cut face and while preventing deformation, cracking, and the like from occurring on the cut face.

Next, using drying apparatuses such as a microwave drying apparatus, a hot air drying apparatus, a dielectric drying apparatus, a reduced pressure drying apparatus, a vacuum drying apparatus, a freeze drying apparatus or the like, the above mentioned honeycomb molded body is dried, thus forming a dried honeycomb molded body.

Here, there is executed a cutting of cutting both ends of the honeycomb molded body produced by the cutting apparatus, thereby attaining a honeycomb molded body of a predetermined length. According to this, it is assumed that it becomes easier to ignore any shrinkage of the honeycomb molded body that may have occurred during drying.

Next, cell plugging will be performed as needed. In the cell plugging, the end portions of the outlet sides of the inlet side cell group, as well as the end portions of the inlet sides of the outlet side cell group, are filled with a predetermined amount of plug material paste, which becomes the actual plug. When performing cell plugging, a plugging mask is first superimposed over the end faces (the cut faces after the cutting) of the honeycomb molded body, after which the plug material paste is injected only to the cells that requires plugging.

Although the above mentioned plug material paste is not limited in particular, it is preferable that the plug material paste, manufactured through the subsequent operation, has a porosity of at least about 30% and at most about 75%. For example, it is possible to use the same as the above mentioned wet mixtures.

It is acceptable to conduct filling of the above mentioned plug material paste according to necessity, and in a case of conducting filling of the above mentioned plug material paste, it is possible to use the honeycomb structured body attained through the subsequent operations optimally as a honeycomb filter, for instance. And in a case of not having filled the above mentioned plug material paste, it is possible to use the honeycomb structured body attained through the subsequent operations optimally as a catalyst supporting carrier, for instance.

Next, by executing degreasing (at least about 200 Degrees Celsius and at most about 500 Degrees Celsius, for example) and firing (at least about 1400 Degrees Celsius and at most about 2300 Degrees Celsius, for example) under predetermined conditions to the honeycomb molded body filled with the above mentioned plug material paste, it becomes easier to manufacture a honeycomb fired body (see FIGS. 4A and 4B) that is comprised of a singular fired body and has a plurality of cells placed in parallel to each other in the longitudinal direction with a cell wall therebetween, and also that either of end portions of each of the cells is sealed.

The conditions under which degreasing and firing are executed to the above mentioned honeycomb molded body can be the same conditions that have been used conventionally when manufacturing a filter comprised of porous ceramic.

Next, a sealing material paste layer is formed with uniform thickness by applying a sealing material paste, which becomes the sealing material layer 11 (the adhesive layer), to the side surfaces of the honeycomb fired body. After this, another honeycomb fired body is piled up onto the above mentioned honeycomb fired body, to which the sealing material paste layer has been applied. By carrying out the above operation repeatedly, predetermined size of an aggregate of honeycomb fired bodies is produced.

It is possible to use a substance containing inorganic fiber and/or inorganic particle in addition to inorganic binder, organic binder, for example, as the above mentioned sealing material paste.

It is acceptable to use silica sol, alumina sol, and the like as the above mentioned inorganic binder. Also, it is acceptable to use the above singly, or use a combination of two or more of them in parallel. Of the above mentioned inorganic binders, silica sol is preferable for use.

It is acceptable to use polyvinyl alcohol, methyl cellulose, ethyl cellulose, carboxymethyl cellulose, and the like, for example, as the above mentioned organic binder. Also, it is acceptable to use the above singly, or use a combination of two or more of them in parallel. Of the above mentioned organic binders, carboxymethyl cellulose is preferable for use.

It is acceptable to use ceramic fibers such as silica-alumina, mullite, alumina, silica and the like, for example, as the above mentioned inorganic fiber. Also, it is acceptable to use the above singly, or use a combination of two or more of them in parallel. Of the above mentioned inorganic fiber, alumina fiber is preferable for use.

It is acceptable to use carbide, nitride, and the like, for example, as the above mentioned inorganic particle. More specifically, it is acceptable to use inorganic powder and the like comprised of silicon carbide, silicon nitride, boron nitride, or the like, for example, as the above mentioned inorganic particle. It is acceptable to use the above singly, or use a combination of two or more of them in parallel. Of the above mentioned inorganic particle, silicon carbide, which excels in its thermal conductivity properties, is preferable for use.

And furthermore, it is also acceptable, according to need, to add a pore-forming agent such as balloon which is a micro sized hollow sphere having oxide series ceramic as a component, spherical acrylic particle, or graphite and the like, to the above mentioned sealing material paste.

The above mentioned balloon is not particularly limited, examples of the balloon include alumina balloons, glass micro balloon, shirasu balloon, fly ash balloon (FAballoon), mullite balloon, for example. Of the above mentioned, alumina balloon is preferable for use.

Next, the aggregate of the honeycomb fired bodies is heated to dry the sealing material paste layer, which then hardens to become the sealing material layer (the adhesive layer).

Next, using a diamond cutter or the like, a cutting is carried out on the aggregate of the honeycomb fired bodies, which is comprised of a plurality of honeycomb fired bodies adhered together by interposing the sealing material layer (the adhesive layer), thereby producing a cylindrical ceramic block.

Afterward, a sealing material layer (a coat layer) is formed by coating the above mentioned sealing material paste to the outer periphery of the ceramic block, thereby manufacturing a honeycomb structured body having the sealing material layer (the coat layer) disposed on the outer peripheral portion of a cylindrical ceramic block comprised of a plurality of honeycomb fired bodies adhered together by interposing the sealing material layer (the adhesive layer).

Afterward, a catalyst is supported on the honeycomb structured body as needed. It is also acceptable to support the above mentioned catalyst onto the honeycomb fired bodies, before the aggregate of the honeycomb fired bodies is manufactured.

In a case wherein the catalyst is supported, it is preferable that an alumina film, which has a high specific surface area, be formed onto the surface of the honeycomb structured body, and a co-catalyst or a catalyst such as platinum and the like is applied to the surface of the alumina film.

As a method of forming the alumina film onto the surface of the above mentioned honeycomb structured body, it is acceptable to apply, for example, a method of impregnating the honeycomb structured body with a metallic compound containing an aluminum such as $Al(NO_3)_3$, and then heating, or a method of impregnating the honeycomb structured body with a solution containing alumina powder and then heating and other methods.

As a method of applying the co-catalyst onto the above mentioned alumina film, it is acceptable to apply, for example, a method of impregnating the honeycomb structured body with a metallic compound solution containing a rare earth element such as $Ce(NO_3)_3$, and then heating.

As a method of applying the catalyst onto the above mentioned alumina film, it is acceptable to apply, for example, a method of impregnating the honeycomb structured body with a dinitrodiammine platinum nitric acid solution ($[Pt(NH_3)_2(NO_2)_2]HNO_3$, platinum content about 4.53% by weight) and the like, and then heating and other methods.

Also, it is acceptable to apply the catalyst with a method of first applying the catalyst to alumina particles in advance, and subsequently impregnating the honeycomb structured body with the solution containing the alumina powder to which the catalyst has been applied in advance and then heating.

According to the embodiment of the method for manufacturing a honeycomb structured body put forth up to this point, although the honeycomb structured body is an aggregated honeycomb structured body having a configuration of a plurality of honeycomb fired bodies bound together by interposing the sealing material layer (the adhesive layer), the honeycomb structured body manufactured according to the method for manufacturing a honeycomb structured body of the third aspect of the present invention may also be an integral honeycomb structured body having a configuration of a cylindrical ceramic block configured of a single honeycomb fired body. It is preferable that the main component material of the integral honeycomb structured body be cordierite or aluminum titanate.

In a case of manufacturing an integral honeycomb structured body of this kind, except that the size of the honeycomb molded body that is extrusion-molded is larger in the case of manufacturing an integral honeycomb structured body than that in the case of manufacturing an aggregated honeycomb structured body, the method used to manufacture an integral honeycomb structured body are identical to those used in manufacturing an aggregated honeycomb structured body. And, also in this method, the above mentioned honeycomb molded body is cut by the molded body cutting apparatus to produce a honeycomb molded body.

Next, in the same manner as in the method for manufacturing an aggregated honeycomb structured body, using a drying apparatus such as a microwave drying apparatus, a hot air drying apparatus, a dielectric drying apparatus, a reduced pressure drying apparatus, a vacuum drying apparatus, a freeze drying apparatus or the like, the above mentioned honeycomb molded body is dried.

Next, the cutting operation of cutting both of the end portions of the dried honeycomb molded body is carried out.

Next, cell plugging is executed, and the end portions of the outlet sides of the inlet side cell group, as well as the end portions of the inlet sides of the outlet side cell group, are filled with a predetermined amount of plug material paste which becomes a plug, to seal the cells.

Afterward, in the same manner as in the manufacture of the aggregated honeycomb structured body, degreasing and firing are executed, thereby producing a ceramic block. And as needed, a sealing material layer (the coat layer) is formed, thereby manufacturing the integral honeycomb structured body. It is also acceptable to support a catalyst on the above mentioned integral honeycomb structured body as well, by the method put forth herein above.

With the method for manufacturing a honeycomb structured body according to the embodiment of the third aspect of the present invention described herein above, it becomes easier to manufacture a honeycomb structured body with high operational efficiency.

Also, in a case of manufacturing a honeycomb structured body according to the above mentioned method, because the honeycomb molded body is cut using a predetermined molded body cutting apparatus, it becomes easier to produce, with ease, a honeycomb molded body having a smooth cut face having no deformation, cracking, or the like, and no adhered matter to. Also, because it becomes easier to conduct cutting of the honeycomb molded body, changes of the cutting length and the like, continuously following extrusion-molding in a fully automated manner, it becomes easier to improve the efficiency of the manufacturing line.

Also, although description has been focused on the honeycomb filter for the purpose of capturing particulates in the exhaust gas, the above mentioned honeycomb structured body can also be used suitably as a catalyst supporting carrier (honeycomb catalyst) for converting exhaust gas.

EXAMPLES

Herein below, examples of the present invention will be set forth, describing in greater detail of the present invention. However, the present invention is not to be limited to only these examples.

In the cutting of a honeycomb molded body of the method for manufacturing a honeycomb structured body according to the embodiment of the third aspect of the present invention, a honeycomb molded body was cut using the method for cutting a ceramic molded body according to the embodiment of the second aspect of the present invention. Various changes were made to the cutting conditions at this time and evaluation was made of the influence on the shape around the cut face of the produced honeycomb molded body.

Example 1

250 kg of α-type silicon carbide powder having a mean particle diameter of 10 μm, 100 kg of α-type silicon carbide powder having a mean particle diameter of 0.5 μm, and 20 kg of organic binder (methyl cellulose) were blended together to prepare a powder mixture.

Next, 12 kg of lubricating agent (UNILUBE, Manufactured by NOF Corp.), 5 kg of plasticizer (glycerin), and 65 kg of water were blended in a separate container to prepare a liquid mixture. Next, using a wet mixing machine, the powder mixture and the liquid mixture were blended together, thereby preparing the wet mixture.

And the moisture content of the above prepared wet mixture was 14% by weight.

Next, using a conveyer apparatus, the wet mixture was conveyed to the extrusion-molding machine, and put into the raw material induction port of the extrusion-molding machine.

The moisture content of the wet mixture immediately before being put into the extrusion-molding machine was 13.5% by weight. The wet mixture was then extrusion-molded to produce a continuous honeycomb molded body having the cross-sectional shape (with the end portions not being sealed) shown in FIGS. 4A and 4B.

Next, using the molded body cutting apparatus of the first aspect of the present invention shown in FIGS. 1A, 1B and FIGS. 2A, 2B, 2C, 2D, and 2E, an extrusion-molded honeycomb molded body was cut under the conditions shown in Table 1-1, to produce a honeycomb molded body. Concretely stated, the above mentioned wet mixture was extrusion-molded from the extrusion-molding machine 40 at an extrusion rate of 3.3 m/min, and the produced continuous honeycomb molded body 30 was cut using a filamentous body as the cutting member 28.

As the filamentous body, a material in which seven wires made of SUS313 each having a diameter of 0.03 mm were S-laid, and the periphery thereof was coated with nylon resin, was used. The diameter of this filamentous body was 0.09±0.01 mm, and the pitch of the twine was 1.08±0.10 mm.

The diameter d [mm] of the filamentous body, as well as, after cutting, the degree of tension T [N] of the filamentous body, the conveyance speed $V_1$ [m/min] of the first conveyer member, the movement speed $V_2$ [m/min] of the cutting member in the parallel direction, the conveyance speed $V_3$ [m/min] of the second conveyer member, the ratio ($V_2/V_1$) of the speed $V_2$ to the speed $V_1$, and the ratio ($V_3/V_1$) of the speed $V_3$ to the speed $V_1$ at this time are shown in Table 1-1.

Examples 2, 3

Except the point of setting the diameter of the filamentous body cutting member to the value indicated in Table 1-1, the honeycomb molded body was produced by cutting the honeycomb molded body in the same manner as of the Example 1.

Examples 4, 5

Except the point of setting the conveyance speed of the first conveyer member, the movement speed of the cutting member in the parallel direction, and the conveyance speed of the second conveyer member after cutting the honeycomb molded body to the values indicated in Table 1-1, the honeycomb molded body was produced by cutting the honeycomb molded body in the same manner as of the Example 1.

Comparative Example 1

Except the point of setting the conveyance speed of the first conveyer member, the movement speed of the cutting member in the parallel direction, and the conveyance speed of the second conveyer member after cutting the honeycomb molded body to the be equivalent, the honeycomb molded body was produced by cutting the honeycomb molded body in the same manner as of the Example 1.

(Evaluation of the Cut Face of the Honeycomb Molded Body)

Evaluation was made in regard to the honeycomb molded bodies produced according to each of the Examples and Comparative Examples by visual observation of the shape in the neighborhood of the external circumference of the cut face, as well as cell deformation, chipping, or cracking, and also the presence of adhered matter to the cut face.

The results are as shown in Table 1-2.

TABLE 1-1

| | Diameter of the Filamentous Body d [mm] | Tension of the Filamentous Body T [N] | Conveyance Speed $V_1$ of the First Conveyer Member [m/min] | Movement Speed $V_2$ (*1) of the Cutting Member in the Parallel Direction [m/min] | Conveyance Speed $V_3$ (*1) of the second Conveyer Member [m/min] | Ratio of $V_2$ to $V_1$ ($V_2/V_1$) | Ratio of $V_3$ to $V_1$ ($V_3/V_1$) |
|---|---|---|---|---|---|---|---|
| Example 1 | 0.1 | 5.5 | 3.3 | 18.0 | 25.0 | 5.5 | 7.6 |
| Example 2 | 0.05 | 3.0 | 3.3 | 18.0 | 25.0 | 5.5 | 7.6 |
| Example 3 | 0.2 | 7.0 | 3.3 | 18.0 | 25.0 | 5.5 | 7.6 |
| Example 4 | 0.1 | 5.5 | 3.3 | 18.0 | 20.0 | 5.5 | 6.1 |
| Example 5 | 0.1 | 5.5 | 3.3 | 15.0 | 25.0 | 4.5 | 7.6 |
| Comparative Example 1 | 0.1 | 5.5 | 3.3 | 3.3 | 3.3 | 1.0 | 1.0 |

(*1) Speed after the honeycomb molded body is cut

TABLE 1-2

| | Shape In The Neighborhood of The Exterior Circumference Of The Cut Face | Presence of Cell Deformation, Chipping, or Cracking | Presence of Adhered Matter |
|---|---|---|---|
| Example 1 | No Deformation | Not Present | Not Present |
| Example 2 | No Deformation | Not Present | Not Present |
| Example 3 | No Deformation | Not Present | Not Present |
| Example 4 | No Deformation | Not Present | Not Present |
| Example 5 | No Deformation | Not Present | Not Present |
| Comparative Example 1 | Raised Deformation (*2) | Partial Deformation, Chipping, or Cracking | Present |

(*2) A deformation like a raised portion in the neighborhood of the upper face of the honeycomb molded body in the exterior circumferential portion of the cut face As can be clearly seen from Table 1-2, there was no occurrence of cell deformation, chipping, or cracking on the cut face of the honeycomb molded bodies produced in the examples 1 to 5. And because there was also no adhered matter on the cut face, it was confirmed that the honeycomb molded body was cut in a favorable manner.

Alternately, on the cut face of the honeycomb molded body produced in the Comparative Example 1, there was slightly deformation in the shape of the exterior circumferential portion of the cut face, and also cell deformation, chipping and cracking. Also, in the honeycomb molded body produced in the comparative example 1, it was confirmed the presence of some adhered matter thought to be constitution material of the honeycomb molded body at the time of cutting.

What is claimed as new and desired to be secured by Letters Patent of the United States is:

1. A method for cutting a ceramic molded body, comprising:
    cutting an extrusion-molded pillar-shaped ceramic molded body to a predetermined length by using a molded body cutting apparatus,
    wherein said molded body cutting apparatus comprises:
    a first conveyer member that conveys an extrusion-molded uncut pillar-shaped ceramic molded body;
    a cutting member that moves in a direction parallel to a movement direction of said first conveyer member while moving also in a vertical direction, and cuts said ceramic molded body to a predetermined length by passing through the interior of said ceramic molded body; and
    a second conveyer member that conveys a ceramic molded body cut to a predetermined length by said cutting member,
    a conveyance speed of said first conveyer member, a conveyance speed of said second conveyer member, and a movement speed of said cutting member in said parallel direction being almost the same, before said ceramic molded body is cut, and
    each of the conveyance speed of said first conveyer member, the movement speed of said cutting member in said parallel direction, and a conveyance speed of said second conveyer member becoming faster toward the latter, after said ceramic molded body is cut, and
    wherein
    said molded body cutting apparatus further comprises a passage sensor, a cutting control device, and a conveyance control device,
    said passage sensor detects a passage of said extrusion-molded pillar-shaped ceramic molded body and transmits a 'passage start signal' to said cutting control device, and a receipt of said passage start signal by said cutting control device causes the start of an operation of said cutting member,
    at a point in time which the cutting of said ceramic molded body by said cutting member has been completed, said cutting member transmits a 'cutting completion signal' to said conveyance control device and a receipt of said cutting completion signal by said conveyance control device changes the conveyance speed of the second conveyer member to be faster than the conveyance speed of said first conveyer member, and
    at a point where said passage sensor ceases to detect the presence of the ceramic molded body, said passage sensor transmits a 'passage complete signal' to said conveyance control device and a receipt of said passage complete signal by said conveyance control device changes the conveyance speed of the second conveyer member to be almost same as the conveyance speed of the first conveyer member.

2. The method for cutting a ceramic molded body according to claim 1, wherein said cutting member is a filamentous body.

3. The method for cutting a ceramic molded body according to claim 2, wherein said filamentous body is a metallic filament whose periphery is coated with a resin.

4. The method for cutting a ceramic molded body according to claim 3, wherein said resin coating the periphery of said metallic filament is any one of nylon, polyester, polyvinyl alcohol and polyacryl.

5. The method for cutting a ceramic molded body according to claim 2, wherein said molded body cutting apparatus is further configured to move said filamentous body, each time said ceramic molded body is cut.

6. The method for cutting a ceramic molded body according to claim 2, wherein a diameter of said filamentous body is at least about 0.05 mm and at most about 0.5 mm.

7. The method for cutting a ceramic molded body according to claim 2, wherein a tension of said filamentous body is at least about 2 N and at most about 8 N.

8. The method for cutting a ceramic molded body according to claim 1, wherein said molded body cutting apparatus further comprises:
    a ball screw that moves said cutting member in said parallel direction; and
    a cylinder that moves said cutting member in the vertical direction.

9. The method for cutting a ceramic molded body according to claim 1, wherein said molded body cutting apparatus further comprises a cutting unit formed of:
    a base that comprises a sender bobbin that sends out said cutting member, a reel-in bobbin that reels in said cutting member, and a plurality of pulleys configured to guide said cutting member from said sender bobbin through a cutting member support portion to said reel-in bobbin; and
    said cutting member.

10. The method for cutting a ceramic molded body according to claim 9, wherein said cutting unit comprises a mechanism which is configured to set said cutting member into motion in a manner so as to pass through the interior of said extrusion-molded pillar-shaped ceramic molded body thereby cutting it in a manner orthogonal to the longitudinal direction of said extrusion-molded pillar-shaped ceramic molded body while moving synchronized with said extrusion-molded pillar-shaped ceramic molded body.

11. The method for cutting a ceramic molded body according to claim 9, wherein said molded body cutting apparatus further comprises a mechanism in which after said pillar-shaped ceramic molded body is cut, said sender bobbin and said reel-in bobbin come into action to move said cutting member just a predetermined length and replacing the cutting member with a new cutting member, and said new cutting member which is newly placed cuts said pillar-shaped ceramic molded body.

12. The method for cutting a ceramic molded body according to claim 9, wherein said cutting unit carries out a cutting of the next extrusion-molded pillar-shaped ceramic molded body using a new cutting member in each single execution of cutting with said cutting member.

13. The method for cutting a ceramic molded body according to claim 1, wherein said molded body cutting apparatus further comprises a mechanism in which a constitution material of the ceramic molded body that has adhered to said cutting member is wiped off after cutting said extrusion-molded pillar-shaped ceramic molded body.

14. The method for cutting a ceramic molded body according to claim 1, wherein a contact portion of each of said first conveyer member and said second conveyer member that makes contact with said ceramic molded body is any one of natural rubber, nylon, urethane, and polyester.

15. The method for cutting a ceramic molded body according to claim 1, wherein a lowering speed of said cutting member is at least about 0.6 m/min and at most about 30 m/min.

16. The method for cutting a ceramic molded body according to claim 1, wherein speed ratios among the conveyance speed of said first conveyer member, the movement speed of said cutting member in the parallel direction, and the conveyance speed of said second conveyer member after cutting said ceramic molded body are (the movement speed of said cutting member in the parallel direction/the conveyance speed of said first conveyer member)=at least about 3 and at most about 7, and (the conveyance speed of said second conveyer member/ the conveyance speed of said first conveyer member)=at least about 5 and at most about 10.

17. The method for cutting a ceramic molded body according to claim 1, wherein said molded body cutting apparatus is capable of changing a disposal location of said passage sensor.

18. A method for manufacturing a honeycomb structured body, comprising:
producing a pillar-shaped honeycomb molded body having a multiplicity of cells placed in parallel to each other in the longitudinal direction with a cell wall therebetween by extrusion-molding a ceramic raw material;
cutting said honeycomb molded body to a predetermined length using a molded body cutting apparatus; and
firing said honeycomb molded body to manufacture a honeycomb structured body comprising a honeycomb fired body,
wherein said molded body cutting apparatus comprises:
a first conveyer member that conveys the extrusion-molded uncut pillar-shaped honeycomb molded body;
a cutting member that moves in a direction parallel to a movement direction of said first conveyer member while moving also in a vertical direction, and cuts said honeycomb molded body to a predetermined length by passing through the interior of said honeycomb molded body; and
a second conveyer member that conveys a honeycomb molded body cut to a predetermined length by said cutting member,
a conveyance speed of said first conveyer member, a conveyance speed of said second conveyer member, and a movement speed of said cutting member in said parallel direction being almost the same, before said honeycomb molded body is cut, and
each of the conveyance speed of said first conveyer member, the movement speed of said cutting member in said parallel direction, and a conveyance speed of said second conveyer member becoming faster toward the latter, after said honeycomb molded body is cut, and
wherein
said molded body cutting apparatus further comprises a passage sensor, a cutting control device, and a conveyance control device,
said passage sensor detects a passage of said extrusion-molded pillar-shaped honeycomb molded body and transmits a 'passage start signal' to said cutting control device, and a receipt of said passage start signal by said cutting control device causes the start of an operation of said cutting member,
at a point in time which the cutting of said honeycomb molded body by said cutting member has been completed, said cutting member transmits a 'cutting completion signal' to said conveyance control device and a receipt of said cutting completion signal by said conveyance control device changes the conveyance speed of the second conveyer member to be faster than the conveyance speed of said first conveyer member, and
at a point where said passage sensor ceases to detect the presence of the honeycomb molded body, said passage sensor transmits a 'passage complete signal' to said conveyance control device and a receipt of said passage complete signal by said conveyance control device changes the conveyance speed of the second conveyer member to be almost same as the conveyance speed of the first conveyer member.

19. The method for manufacturing a honeycomb structured body according to claim 18, wherein said cutting member is a filamentous body.

20. The method for manufacturing a honeycomb structured body according to claim 19, wherein said filamentous body is a metallic filament whose periphery is coated with a resin.

21. The method for manufacturing a honeycomb structured body according to claim 20, wherein said resin coating the periphery of said metallic filament is any one of nylon, polyester, polyvinyl alcohol and polyacryl.

22. The method for manufacturing a honeycomb structured body according to claim 19, wherein said molded body cutting apparatus is further configured to move said filamentous body, each time said honeycomb molded body is cut.

23. The method for manufacturing a honeycomb structured body according to claim 19, wherein a diameter of said filamentous body is at least about 0.05 mm and at most about 0.5 mm.

24. The method for manufacturing a honeycomb structured body according to claim 19, wherein a tension of said filamentous body is at least about 2 N and at most about 8 N.

25. The method for manufacturing a honeycomb structured body according to claim 18, wherein said molded body cutting apparatus further comprises:
a ball screw that moves said cutting member in said parallel direction; and
a cylinder that moves said cutting member in the vertical direction.

26. The method for manufacturing a honeycomb structured body according to claim 18, wherein said molded body cutting apparatus further comprises a cutting unit formed of:
   a base that comprises a sender bobbin that sends out said cutting member, a reel-in bobbin that reels in said cutting member, and a plurality of pulleys configured to guide said cutting member from said sender bobbin through a cutting member support portion to said reel-in bobbin; and
   said cutting member.

27. The method for manufacturing a honeycomb structured body according to claim 26, wherein said cutting unit comprises a mechanism which is configured to set said cutting member into motion in a manner so as to pass through the interior of said extrusion-molded pillar-shaped honeycomb molded body thereby cutting it in a manner orthogonal to the longitudinal direction of said extrusion-molded pillar-shaped honeycomb molded body while moving synchronized with said extrusion-molded pillar-shaped honeycomb molded body.

28. The method for manufacturing a honeycomb structured body according to claim 26, wherein said molded body cutting apparatus further comprises a mechanism in which after said pillar-shaped honeycomb molded body is cut, said sender bobbin and said reel-in bobbin come into action to move said cutting member just a predetermined length and replacing the cutting member with a new cutting member, and said new cutting member which is newly placed cuts said pillar-shaped honeycomb molded body.

29. The method for manufacturing a honeycomb structured body according to claim 26, wherein said cutting unit carries out a cutting of the next extrusion-molded pillar-shaped honeycomb molded body using a new cutting member in each single execution of cutting with said cutting member.

30. The method for manufacturing a honeycomb structured body according to claim 18, wherein said molded body cutting apparatus further comprises a mechanism in which a constitution material of the honeycomb molded body that has adhered to said cutting member is wiped off after cutting said extrusion-molded pillar-shaped honeycomb molded body.

31. The method for manufacturing a honeycomb structured body according to claim 18, wherein a contact portion of each of said first conveyer member and said second conveyer member that makes contact with said honeycomb molded body is any one of natural rubber, nylon, urethane, and polyester.

32. The method for manufacturing a honeycomb structured body according to claim 18, wherein a lowering speed of said cutting member is at least about 0.6 m/min and at most about 30 m/min.

33. The method for manufacturing a honeycomb structured body according to claim 18, wherein speed ratios among the conveyance speed of said first conveyer member, the movement speed of said cutting member in the parallel direction, and the conveyance speed of said second conveyer member after cutting said honeycomb molded body are
   (the movement speed of said cutting member in the parallel direction/the conveyance speed of said first conveyer member)=at least about 3 and at most about 7, and
   (the conveyance speed of said second conveyer member/the conveyance speed of said first conveyer member)=at least about 5 and at most about 10.

34. The method for manufacturing a honeycomb structured body according to claim 18, wherein said molded body cutting apparatus is capable of changing a disposal location of said passage sensor.

35. The method for manufacturing a honeycomb structured body according to claim 18, wherein said honeycomb structured body comprises a honeycomb fired body having a plurality of cells placed in parallel to each other in the longitudinal direction with a cell wall therebetween, either of end portions of each of said cells being sealed.

36. The method for manufacturing a honeycomb structured body according to claim 35, wherein said honeycomb structure body has a structure in which a plurality of said honeycomb fired bodies are bound together by interposing a sealing material layer.

37. The method for manufacturing a honeycomb structured body according to claim 35, wherein said honeycomb structured body comprises a single piece of said honeycomb fired body.

38. The method for manufacturing a honeycomb structured body according to claim 18, wherein said honeycomb structured body comprises a honeycomb fired body having a plurality of cells placed in parallel to each other in the longitudinal direction with a cell wall therebetween, and said cells being not sealed.

39. The method for manufacturing a honeycomb structured body according to claim 38, wherein said honeycomb structured body has a structure in which a plurality of said honeycomb fired bodies are bound together by interposing a sealing material layer.

40. The method for manufacturing a honeycomb structured body according to claim 38, wherein said honeycomb structured body comprises a single piece of said honeycomb fired body.

41. The method for cutting a ceramic molded body according to claim 1, wherein said first conveyer member and said second conveyer member comprise a conveyer belt, and said uncut pillar-shaped ceramic molded body and said ceramic molded body are directly placed on said conveyer belt.

42. The method for manufacturing a honeycomb structured body according to claim 18, wherein said first conveyer member and said second conveyer member comprise a conveyer belt, and said uncut pillar-shaped honeycomb molded body and said honeycomb molded body are directly placed on said conveyer belt.

* * * * *

UNITED STATES PATENT AND TRADEMARK OFFICE
CERTIFICATE OF CORRECTION

PATENT NO. : 7,695,655 B2
APPLICATION NO. : 11/697574
DATED : April 13, 2010
INVENTOR(S) : Norihiko Yamamura, Kazuya Naruse and Eiji Sumiya Page 1 of 1

It is certified that error appears in the above-identified patent and that said Letters Patent is hereby corrected as shown below:

Title page, Item (54) Title: should read as follows:
METHOD FOR CUTTING CERAMIC MOLDED BODY AND METHOD FOR MANUFACTURING HONEYCOMB STRUCTURED BODY Column 1, Line 1, the title of the invention should read as follows:
METHOD FOR CUTTING CERAMIC MOLDED BODY AND METHOD FOR MANUFACTURING HONEYCOMB STRUCTURED BODY Column 36, Line 21, the line should read as follows:
tured body has a structure in which a plurality of said honey- Signed and Sealed this
Eighth Day of March, 2011

David J. Kappos
*Director of the United States Patent and Trademark Office*